United States Patent
Shaga et al.

(10) Patent No.: US 12,111,188 B2
(45) Date of Patent: Oct. 8, 2024

(54) SENSE COIL FOR INDUCTIVE LINEAR-POSITION SENSING, AND RELATED DEVICES, SYSTEMS, AND METHODS

(71) Applicant: Microchip Technology Incorporated, Chandler, AZ (US)

(72) Inventors: Ganesh Shaga, Telangana (IN); Surendra Akkina, Telangana (IN); Sudheer Puttapudi, Telangana (IN)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/648,743

(22) Filed: Jan. 24, 2022

(65) Prior Publication Data

US 2022/0397427 A1    Dec. 15, 2022

(30) Foreign Application Priority Data

Jun. 11, 2021   (IN) .............................. 202141026176

(51) Int. Cl.
  *G01D 5/22*     (2006.01)
  *G01D 5/20*     (2006.01)
(52) U.S. Cl.
  CPC ........... *G01D 5/2275* (2013.01); *G01D 5/204* (2013.01); *G01D 2205/77* (2021.05)
(58) Field of Classification Search
  CPC .... G01D 5/2013; G01D 5/202; G01D 5/2046; G01D 5/2053; G01D 5/2073;
  (Continued)

(56) References Cited

U.S. PATENT DOCUMENTS 1,639,044 A    8/1927   Mansbridge
3,197,763 A    7/1965   Sterling
(Continued)

FOREIGN PATENT DOCUMENTS

CN    106255889 A    12/2016
CN    108351224 A    7/2018
(Continued)

OTHER PUBLICATIONS

English Translation of WO 2021239175 (Year: 2021).*
(Continued)

*Primary Examiner* — Steven L Yeninas
(74) *Attorney, Agent, or Firm* — TraskBritt

(57) ABSTRACT

An apparatus for inductive linear-position sensing is disclosed. An apparatus may include a support structure and an electrically conductive material defining a continuous path for electrical current to flow between a first location and a second location. The continuous path may include: a first path portion defining a first spiraling path for the electrical current to flow in a clockwise direction around a first axis; a second path portion laterally spaced from the first path portion and defining a second spiraling path for the electrical current to flow in a counter-clockwise direction around a second axis; a first coupling portion coupling an inner portion of the first path portion to an inner portion of the second path portion; and a second coupling portion coupling an outer portion of the second path portion to an outer portion of the first path portion. Related systems, devices, and methods are also disclosed.

25 Claims, 11 Drawing Sheets

(58) Field of Classification Search
CPC .. G01D 5/2216; G01D 5/2225; G01D 5/2258;
G01D 5/2275; G01D 5/2291; G01D
5/2454; G01D 5/2457; G01D 2205/77;
G01D 5/204; H01F 17/0006; H01F
17/0013; H01F 17/002; H01F 2017/004;
H01F 2017/0046; H01F 2017/0073; H01F
27/2804

See application file for complete search history.

(56) References Cited

U.S. PATENT DOCUMENTS

| | | | |
|---|---|---|---|
| 3,281,826 A | | 10/1966 | Moffitt |
| 4,223,300 A | * | 9/1980 | Wiklund ............... H03M 1/305 324/207.17 |
| 4,356,732 A | | 11/1982 | Hachtel et al. |
| 4,737,698 A | | 4/1988 | McMullin et al. |
| 4,847,548 A | | 7/1989 | Lafler |
| 4,853,604 A | | 8/1989 | McMullin et al. |
| 5,061,896 A | | 10/1991 | Schmidt |
| 5,239,288 A | | 8/1993 | Tsals |
| 6,111,402 A | * | 8/2000 | Fischer ................ G01D 5/2046 341/15 |
| 6,236,199 B1 | | 5/2001 | Irle et al. |
| 6,239,571 B1 | | 5/2001 | Shimahara |
| 6,255,810 B1 | | 7/2001 | Irle et al. |
| 6,304,014 B1 | | 10/2001 | England et al. |
| 6,304,076 B1 | | 10/2001 | Madni et al. |
| 6,384,598 B1 | | 5/2002 | Hobein et al. |
| 6,483,295 B2 | | 11/2002 | Irle et al. |
| 6,522,128 B1 | | 2/2003 | Ely et al. |
| 6,591,217 B1 | | 7/2003 | Baur et al. |
| 6,593,730 B2 | | 7/2003 | Zapf |
| 6,605,940 B1 | | 8/2003 | Tabrizi et al. |
| 7,276,897 B2 | | 10/2007 | Lee |
| 7,385,389 B2 | | 6/2008 | Tahara et al. |
| 7,719,264 B2 | | 5/2010 | Tiemann |
| 7,726,208 B2 | | 6/2010 | Hoeller et al. |
| 7,821,256 B2 | | 10/2010 | Lee |
| 7,906,960 B2 | | 3/2011 | Lee |
| 8,278,911 B2 | | 10/2012 | Tiemann et al. |
| 8,339,126 B2 | | 12/2012 | Izak et al. |
| 8,345,438 B2 | * | 1/2013 | Mi ........................ H01L 23/645 361/811 |
| 8,451,000 B2 | | 5/2013 | Tiemann |
| 8,482,894 B2 | | 7/2013 | Yra et al. |
| 8,508,242 B2 | | 8/2013 | Shao et al. |
| 8,618,791 B2 | | 12/2013 | Grinberg et al. |
| 8,928,310 B2 | | 1/2015 | Ocket et al. |
| 8,947,077 B2 | | 2/2015 | Lee et al. |
| 8,988,066 B2 | | 3/2015 | Shao et al. |
| 9,234,771 B2 | | 1/2016 | Sasaki |
| 9,300,022 B2 | * | 3/2016 | Vaisman ............... H03H 7/422 |
| 9,322,636 B2 | | 4/2016 | Fontanet |
| 9,528,858 B2 | | 12/2016 | Bertin |
| 9,677,913 B2 | | 6/2017 | Wang et al. |
| 9,929,651 B2 | | 3/2018 | Cannankurichi et al. |
| 10,415,952 B2 | | 9/2019 | Reddy et al. |
| 10,444,037 B2 | | 10/2019 | Bertin |
| 10,760,928 B1 | | 9/2020 | Shaga et al. |
| 10,761,549 B2 | | 9/2020 | Sasmal et al. |
| 10,837,847 B2 | | 11/2020 | Smith, Jr. |
| 10,884,037 B2 | | 1/2021 | Chellamuthu et al. |
| 10,921,155 B2 | | 2/2021 | Shaga et al. |
| 11,525,701 B2 | | 12/2022 | Lugani et al. |
| 11,525,716 B2 | | 12/2022 | El-Shennawy et al. |
| 11,656,101 B2 | | 5/2023 | Shaga |
| 2001/0001430 A1 | | 5/2001 | Ely et al. |
| 2002/0000129 A1 | | 1/2002 | Madni et al. |
| 2002/0097042 A1 | | 7/2002 | Kawate et al. |
| 2003/0062889 A1 | * | 4/2003 | Ely ........................ G06F 3/046 324/207.17 |
| 2003/0067941 A1 | | 4/2003 | Fall |
| 2003/0206007 A1 | | 11/2003 | Gass et al. |
| 2004/0065533 A1 | | 4/2004 | Schwesig et al. |
| 2004/0080313 A1 | | 4/2004 | Brosh |
| 2004/0081313 A1 | | 4/2004 | McKnight et al. |
| 2004/0182602 A1 | * | 9/2004 | Satoh ....................... H01P 5/10 174/258 |
| 2006/0038635 A1 | * | 2/2006 | Richiuso ............... H03H 7/0115 333/185 |
| 2006/0119351 A1 | | 6/2006 | James et al. |
| 2006/0125472 A1 | | 6/2006 | Howard et al. |
| 2007/0001666 A1 | | 1/2007 | Lee |
| 2008/0054887 A1 | | 3/2008 | Lee |
| 2008/0164869 A1 | | 7/2008 | Bach et al. |
| 2008/0174302 A1 | | 7/2008 | Lee et al. |
| 2008/0176530 A1 | | 7/2008 | Kuhn et al. |
| 2008/0238416 A1 | | 10/2008 | Shiraga et al. |
| 2009/0079422 A1 | | 3/2009 | Lee |
| 2010/0271012 A1 | | 10/2010 | Patterson et al. |
| 2011/0101968 A1 | | 5/2011 | Brands et al. |
| 2012/0081106 A1 | | 4/2012 | Grinberg et al. |
| 2012/0175198 A1 | | 7/2012 | Thibault et al. |
| 2012/0242304 A1 | | 9/2012 | Yra et al. |
| 2012/0242352 A1 | | 9/2012 | Gong et al. |
| 2012/0244802 A1 | * | 9/2012 | Feng ..................... H04B 5/0087 336/225 |
| 2013/0021023 A1 | | 1/2013 | Niwa et al. |
| 2013/0257417 A1 | | 10/2013 | Ely |
| 2013/0289826 A1 | | 10/2013 | Yoshitake et al. |
| 2015/0233695 A1 | | 8/2015 | Gomes et al. |
| 2015/0323348 A1 | | 11/2015 | Liu et al. |
| 2015/0323349 A1 | | 11/2015 | Has et al. |
| 2016/0099301 A1 | * | 4/2016 | Yen ..................... H01F 17/0006 257/531 |
| 2016/0214648 A1 | | 7/2016 | Schoepe et al. |
| 2017/0141685 A1 | | 5/2017 | Cannankurichi et al. |
| 2017/0158231 A1 | | 6/2017 | Farrelly |
| 2017/0166251 A1 | | 6/2017 | Shao et al. |
| 2018/0040413 A1 | * | 2/2018 | Yen ..................... H01F 27/2804 |
| 2018/0120083 A1 | | 5/2018 | Reddy et al. |
| 2018/0196453 A1 | | 7/2018 | Sasmal et al. |
| 2018/0224301 A1 | | 8/2018 | Herrmann et al. |
| 2018/0274591 A1 | | 9/2018 | Maniouloux et al. |
| 2018/0274948 A1 | | 9/2018 | Maniouloux et al. |
| 2019/0009903 A1 | | 1/2019 | Chan et al. |
| 2019/0017845 A1 | | 1/2019 | Utermoehlen et al. |
| 2019/0025088 A1 | | 1/2019 | Utermoehlen et al. |
| 2019/0063956 A1 | | 2/2019 | Bertin |
| 2019/0094047 A1 | | 3/2019 | Utermoehlen et al. |
| 2019/0186891 A1 | | 6/2019 | Utermoehlen et al. |
| 2019/0195963 A1 | * | 6/2019 | Qama ..................... H05K 1/165 |
| 2019/0226828 A1 | | 7/2019 | Lugani et al. |
| 2019/0242725 A1 | | 8/2019 | Shaga et al. |
| 2019/0326501 A1 | | 10/2019 | Gilbert et al. |
| 2019/0331541 A1 | | 10/2019 | Janisch et al. |
| 2019/0360839 A1 | | 11/2019 | Shao |
| 2020/0088549 A1 | | 3/2020 | Shao |
| 2020/0200569 A1 | | 6/2020 | Utermoehlen et al. |
| 2020/0271480 A1 | * | 8/2020 | Shaga ................... G01D 5/2053 |
| 2021/0063206 A1 | | 3/2021 | Ausserlechner |
| 2021/0080243 A1 | | 3/2021 | Ocket et al. |
| 2021/0098187 A1 | * | 4/2021 | Kumar ............... H01F 27/2823 |
| 2021/0180992 A1 | | 6/2021 | Lugani et al. |
| 2021/0226877 A1 | | 7/2021 | Tamasi et al. |
| 2021/0255657 A1 | | 8/2021 | Miller et al. |
| 2021/0372823 A1 | | 12/2021 | Witts et al. |
| 2022/0011138 A1 | | 1/2022 | Shaga et al. |
| 2022/0034684 A1 | | 2/2022 | Le Goff et al. |
| 2022/0136869 A1 | | 5/2022 | Shaga |
| 2022/0155050 A1 | | 5/2022 | Gillet et al. |
| 2022/0307868 A1 | | 9/2022 | Shaga et al. |
| 2023/0045209 A1 | | 2/2023 | Shaga |
| 2023/0175869 A1 | | 6/2023 | Leonard |

FOREIGN PATENT DOCUMENTS

| | | |
|---|---|---|
| CN | 112272755 A | 1/2021 |
| CN | 112484621 A | 3/2021 |
| DE | 4021637 A1 | 1/1992 |
| DE | 10120822 A1 | 4/2002 |
| DE | 102015220615 A1 | 4/2017 |

(56) References Cited

FOREIGN PATENT DOCUMENTS

| | | | |
|---|---|---|---|
| DE | 102019207070 A1 | 11/2020 |
| EP | 0467514 A2 | 1/1992 |
| EP | 0845659 A2 | 6/1998 |
| EP | 1078226 B1 | 10/2003 |
| EP | 1914520 A2 | 4/2008 |
| EP | 2145158 A2 | 1/2010 |
| EP | 2044389 B1 | 4/2010 |
| EP | 3245485 A1 | 11/2017 |
| EP | 3865825 A1 | 8/2021 |
| FR | 2304900 A1 | 10/1976 |
| GB | 1502697 A | 3/1978 |
| GB | 2394293 A | 4/2004 |
| JP | 3839449 B2 | 11/2006 |
| JP | 2021-025851 A | 2/2021 |
| WO | 2008/125853 A1 | 10/2008 |
| WO | 2008/139216 A2 | 11/2008 |
| WO | 2016/079465 A1 | 5/2016 |
| WO | 2017/100515 A1 | 6/2017 |
| WO | 2018/108783 A2 | 6/2018 |
| WO | 2019/152092 A1 | 8/2019 |
| WO | 2021/239175 A1 | 12/2021 |

OTHER PUBLICATIONS

International Search Report from International Application No. PCT/US2022/070307, dated Apr. 8, 2022, 4 pages.

International Written Opinion from International Application No. PCT/US2022/070307, dated Apr. 8, 2022, 9 pages.

"A Revolution in Sensing: World's First Inductance-to-Digital Converter", LDC1000 Inductive Sensing Brochure, Texas Instruments, 2013, pp. 1-6, Almaden Press, San Jose, CA.

"Inductive Sensor Coil Design Using LX3301A", AN-S1412 Application Note, Microsemi Corporate Headquarters, One Enterprise, Aliso Viejo, CA 92656 USA, Nov. 2017.

International Search Report for International Application No. PCT/US2022/078524, dated Apr. 11, 2023, 7 pages.

International Written Opinion for International Application No. PCT/US2022/078524, dated Apr. 11, 2023, 14 pages.

Dauth et al., An Effective Method to Model and Simulate the Behavior of Inductive Angle Encoders, Sensors 22, No. 20: 7804, Oct. 14, 2022, 26 pages.

International Search Report and Written Opinion of the International Searching Authority for related application PCT/US2015/027900 mailed on Jun. 23, 2015, 10 pages.

International Search Report and Written Opinion of the International Searching Authority of International Application No. PCT/US2019/044245, dated Nov. 15, 2019, 10 pages.

International Search Report and Written Opinion of the International Searching Authority of International Application No. PCT/US2021/012006, dated Apr. 7, 2021, 12 pages.

International Search Report and Written Opinion of the International Searching Authority of International Application No. PCT/US2021/039578, mailed Oct. 14, 2021, 10 pages.

International Search Report for International Application No. PCT/US2023/065238, mailed Jul. 3, 2023, 6 pages.

International Search Report of International Application No. PCT/US2023/077323, mailed Jan. 22, 2024, 6 pages.

International Written Opinion for International Application No. PCT/US2023/065238, mailed Jul. 3, 2023, 9 pages.

Lugani et al., High speed inductive position sensor for E-machines, Melexis Technologies SA, 2021, 7 pages.

Microchip Technology Inc., "Inductive Sensor Interface IC with Embedded MCU", Summary Data Sheet LX3302A, DS20006496A (Feb. 2020) 48 pages.

Microchip Technology Inc., "Robust, Low-Cost and Noise-Immune Motion-Sensing Inductive Sensors", Automotive brochure, DS00002864A, www.microchip.com/automotive (Dec. 2018) 2 pages.

Song et al.," Simulations of Nonuniform Behaviors of Multiple No-Insulation (RE)Ba2Cu307-x HTS Pancake Coils During Charging and Discharging", IEEE Transactions on Applied Superconductivity, vol. 26, No. 4, (Jun. 2016) 5 pages.

Written Opinion of the International Search Authority of International Application No. PCT/US2019/042895, dated Oct. 21, 2019, 8 pages.

Written Opinion of the International Searching Authority of International Application No. PCT/US2018/063681, dated Mar. 8, 2019, 7 pages.

Written Opinion of the International Searching Authority of International Application No. PCT/US2021/12018, dated Mar. 3, 2021, 5 pages.

Written Opinion of the International Searching Authority of International Application No. PCT/US2023/077323, mailed Jan. 23, 2024, 9 pages.

First Office Action and Search Report of Chinese Patent Application No. 202180096199.0, issued May 8, 2024, 32 pages with English translation.

* cited by examiner

SENSE COIL FOR INDUCTIVE LINEAR-POSITION SENSING, AND RELATED DEVICES, SYSTEMS, AND METHODS

CROSS-REFERENCE TO RELATED APPLICATIONS

This application claims the benefit of the priority date of Indian Provisional Patent Application No. 202141026176, filed Jun. 11, 2021, and titled "PLANAR LINEAR INDUCTIVE POSITION SENSOR AND ITS ASSOCIATED METHOD OF USE FOR VALVE APPLICATIONS," the disclosure of which is incorporated herein in its entirety by this reference.

FIELD

This description relates, generally, to linear-position sensing. More specifically, some examples relate to one or more sense coils for inductive linear-position sensing, without limitation. Additionally, some examples relate to a target for inductive linear-position sensing, without limitation. Additionally, devices, systems, and methods are disclosed.

BACKGROUND

If a coil of wire is placed in a changing magnetic field, a voltage will be induced at ends of the coil of wire. In a predictably changing magnetic field, the induced voltage will be predictable (based on factors including the area of the coil affected by the magnetic field and the degree of change of the magnetic field). It is possible to disturb a predictably changing magnetic field and measure a resulting change in the voltage induced in the coil of wire. Further, it is possible to create a sensor that measures movement of a disturber of a predictably changing magnetic field based on a change in a voltage induced in one or more coils of wire.

BRIEF DESCRIPTION THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1A:
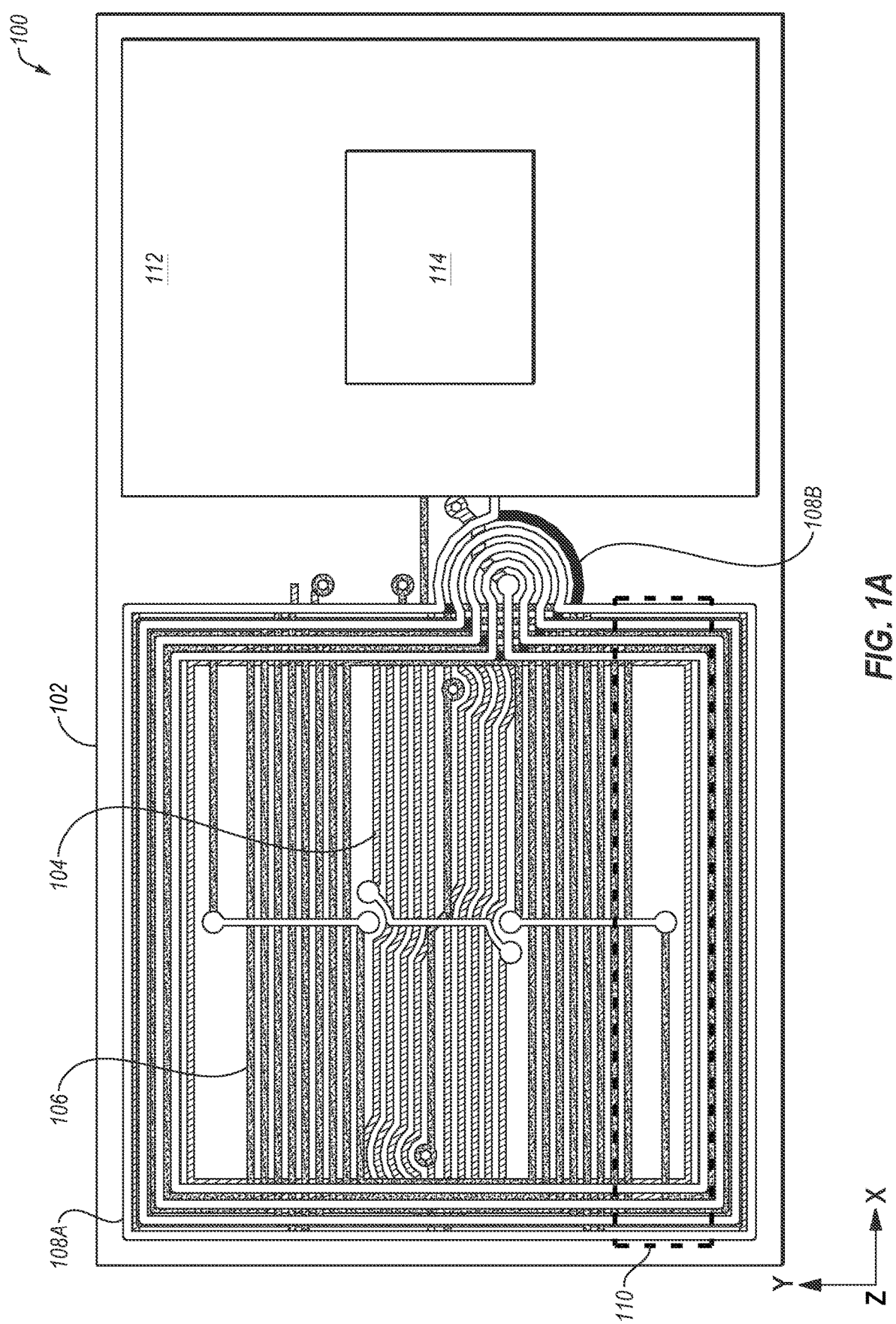
FIG. 1A is a schematic diagram illustrating a top view of an example inductive linear-position sensor according to one or more examples.

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the examples disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

An inductive linear-position sensor may include an oscillator, one or more oscillator coil, a first sense coil, a second sense coil, a target, and an integrated circuit. The oscillator may be configured to generate an excitation signal. The one or more oscillator coils may be excited by the excitation signal. The oscillating signal on the one or more oscillator coils may generate a changing (oscillating) magnetic field within and without a space encircled by the oscillator coil.

The first sense coil and the second sense coil may each encircle a space in which the one or more oscillator coils are capable of generating magnetic field, e.g., a space within the space encircled by the one or more oscillator coils. The changing magnetic field generated by the one or more oscillator coils may induce a first oscillating voltage at ends of the first sense coil and a second oscillating voltage at ends of the second sense coil. The first oscillating voltage at the ends of the first sense coil may oscillate in response to the oscillation of the excitation signal and may be a first sense signal. The second oscillating voltage at the ends of the second sense signal may oscillate in response to the oscillation of the excitation signal and may be a second sense signal.

The target may be positioned relative to the one or more oscillator coils, the first sense coil, and the second sense coil. For example, the target may be positioned above a portion the one or more oscillator coils, the first sense coil, and the second sense coil, without limitation. The target may disturb some of the changing magnetic field that passes through one or more loops of the first sense coil and the second sense coil.

The first sense coil and the second sense coil may be configured such that the location of the target above one or more of the first sense coil and the second sense coil may affect the first sense signal and the second sense signal induced in the first sense coil and the second sense coil, respectively. For example, in response to the target being over a loop in the first sense coil, the amplitude of the first sense signal may be less than the amplitude of the first sense signal when the target is not over the loop in the first sense coil.

Further, the target may be configured to move (e.g., along a straight path, without limitation) above one or more loops of one or more of the one or more oscillator coils, the first sense coil and the second sense coil. As the target moves, each of the first sense signal of the first sense coil and the second sense signal of the second sense coil may be amplitude modulated in response to the movement of the target.

In various examples, the integrated circuit may be configured to generate an output signal responsive to the first sense signal and the second sense signal. The output signal may be a fraction of a rail voltage (VCC) based on the first sense signal and the second sense signal. The output signal may be related to a linear position of the target and successive samples of the output signal may be related to a direction of movement of the target. Thus, the linear-position sensor may be configured to generate an output signal indicative of one or more of a linear-position of a target and a direction of movement of the target.

In various examples, the integrated circuit may be configured to generate a first output signal based on the first sense signal and a second output signal based on the second sense signal. The first output signal may be the first sense signal demodulated; the second output signal may be the second sense signal demodulated. Together, the two output signals may be related to a linear position of the target and subsequent samples of the first and second output signals may be related to a linear movement of the target.

In various examples, the integrated circuit may be configured to generate a single output signal based on the first sense signal and the second sense signal. Some examples include sense coils that cause an integrated circuit to generate a constant-slope output signal in response to movement of the target over the loops of the first sense coil and the second sense coil. The constant-slope output signal may be an output signal with a known correlation between an amplitude of the output signal and the linear-position of the target.

Some examples include a layout of the first sense coil and the second sense coil substantially in two planes (e.g., layers of a printed circuit board (PCB), without limitation). In other words, some examples include loops of the first sense coil and loops of the second sense coil that are all substantially formed in two planes of a multi-plane conductor (e.g., a PCB, without limitation). Further, some examples include a continuous path that includes multiple passes around each of the loops in relation to an axis thereof, all substantially within the two planes. Other sense coils known to the inventor of this disclosure may include sense coils formed of more than two conductive layers of a PCB. Forming sense coils including multiple passes around loops in which the sense coils are substantially in two planes is an improvement over sense coils formed in more than two planes at least because sense coils in two planes may be cheaper, faster, and simpler to produce and may be thinner than sense coils formed in more than two planes. Further, sense coils including multiple passes around loops in which the sense coils are substantially in two planes may be more sensitive than sense coils formed in more than two planes because sense coils formed in more than two planes may have a greater distance between some of the passes of the sense coils and the target than sense coils formed in two planes. Additionally, some examples include a layout of the first sense coil and the second sense coil that each include more respective passes around each of the loops than other sense coils known to the inventor of this disclosure. The number of passes around each of the loops of the sense coils may be related to the sensitivity of a sensor including the sense coils. Therefore, examples of this disclosure may allow for more sensitive sensors than other sense coils.

Some examples include a target that has a semi-circular profile at a portion of the target closest to the sense coils. A target with a semi-circular profile closest to the sense coils may result in a modulation of the induced sense signals in the sense coils that has a sinusoidal shape. Sense signals with a sinusoidal modulation shape may be more accurately translated into linear-position signals, e.g., through a geometric function (e.g., an arctangent). Targets with at least a partial semi-circular profile represent an improvement over other targets known to the inventor of this disclosure because of the shape of the modulation of the sense signals resulting from such targets allows for more accurate and/or simple translation into linear-position measurements. Other examples include targets having an oval profile or at least a semi-oval profile.

FIG. 1A is a schematic diagram illustrating a top view of an example inductive linear-position sensor 100 according to one or more examples. Inductive linear-position sensor 100 includes a first sense coil (sine sense coil 104) and a second sense coil (cosine sense coil 106) arranged according to one or more examples. The continuous path of each of sine sense coil 104 and cosine sense coil 106 may include spiraling looping portions including multiple passes through multiple loops all arranged substantially in two planes.

Inductive linear-position sensor 100 may include a support structure 102 configured to support electrically conductive material (e.g., formed into one or more of sine sense coil 104, cosine sense coil 106, oscillator coil 108A and oscillator coil 108B (oscillator coil 108A and oscillator coil 108B may be referred to herein collectively as oscillator coils 108), without limitation) on, or in, two or more planes parallel to the depicted x-y plane that may, but are not required to, correspond to layers of support structure 102. Support structure 102, including sine sense coil 104, cosine sense coil 106, oscillator coils 108, and various connecting lines and vias may be, as a non-limiting example, a PCB or other semiconductor substrate.

Figure 1B:
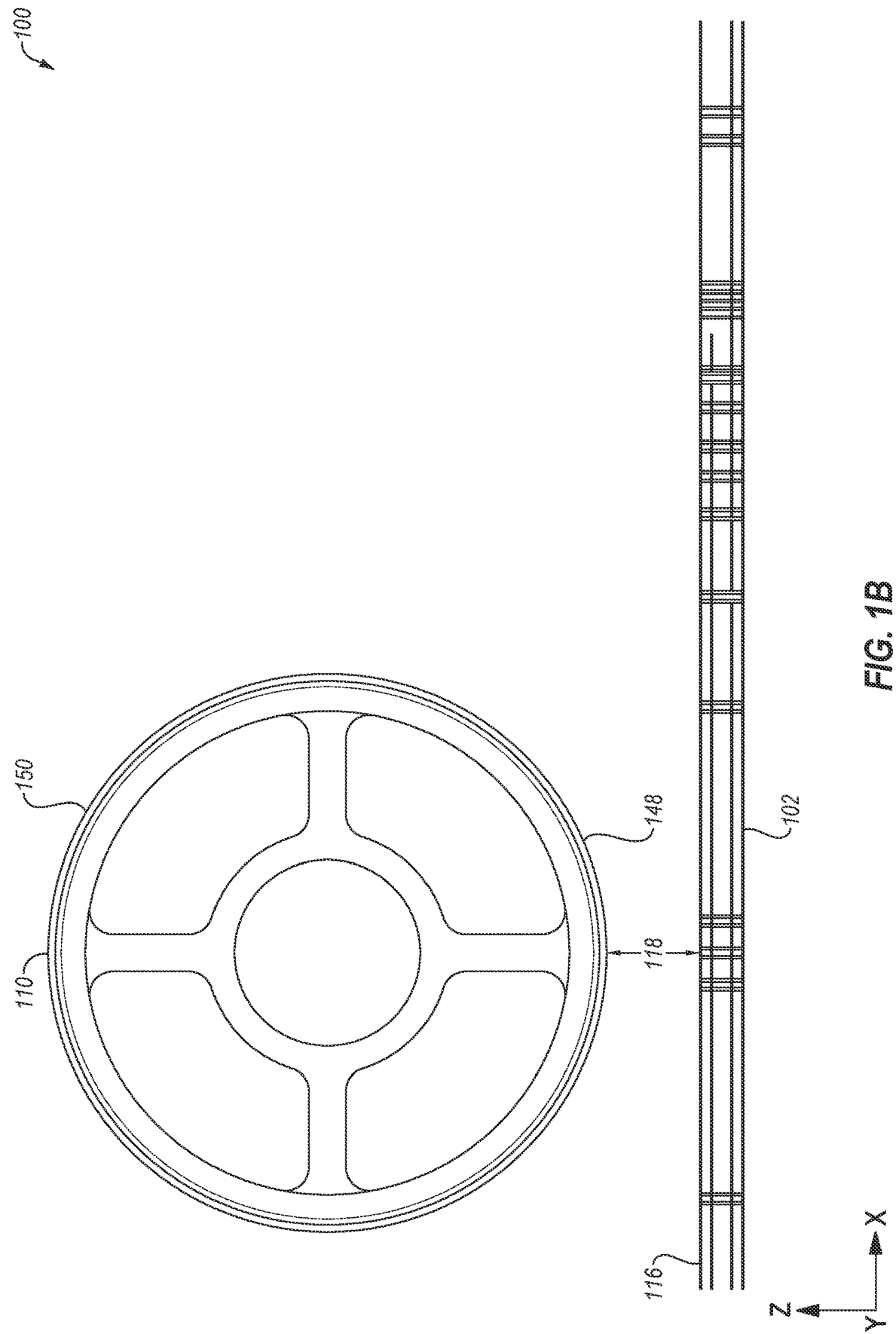
FIG. 1B is a schematic diagram illustrating a side view of the example inductive linear-position sensor of FIG. 1A according to one or more examples.
Figure 1C:
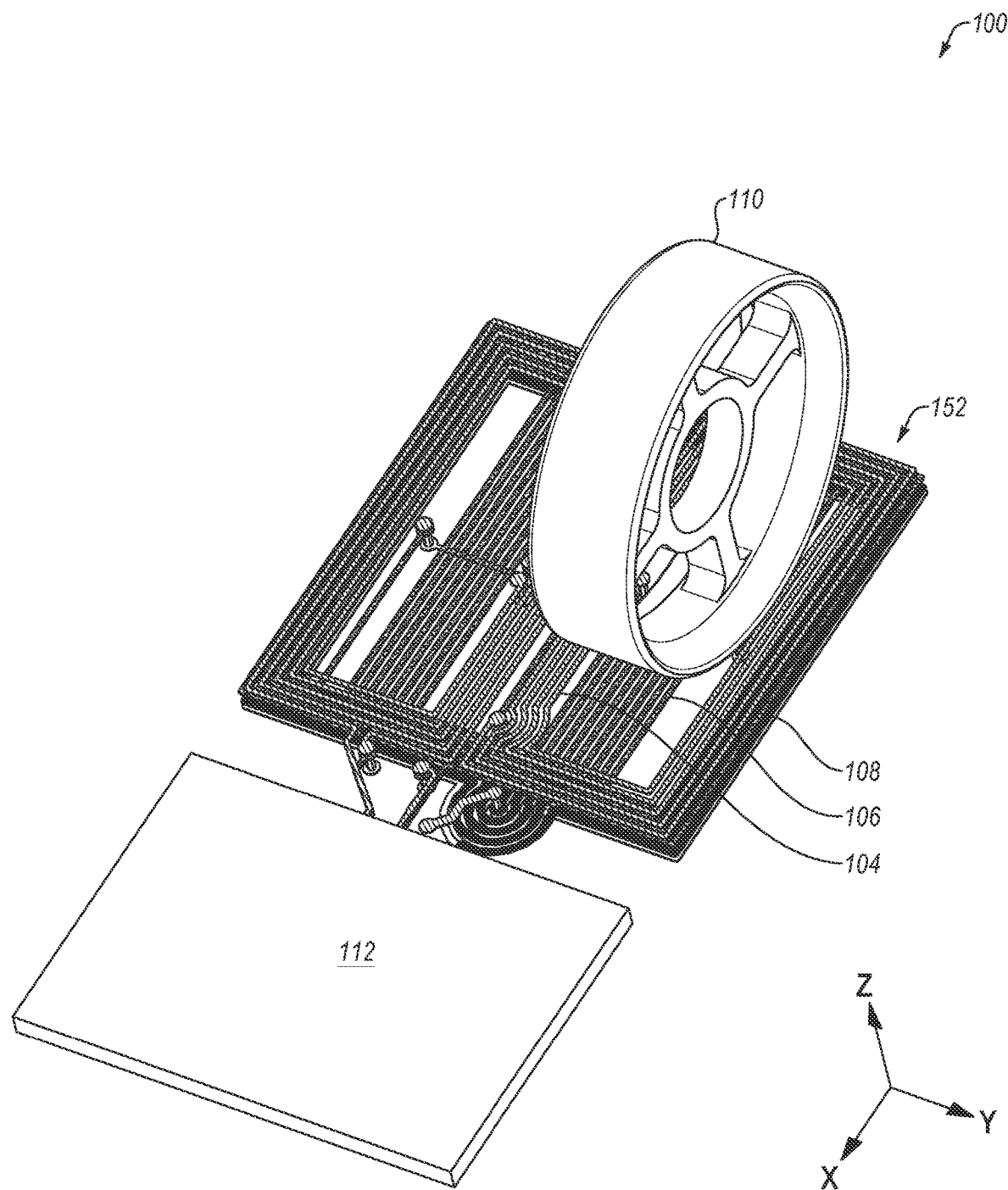
FIG. 1C is a schematic diagram illustrating a perspective view of the example inductive linear-position sensor of FIG. 1A, with the target in a first position, according to one or more examples.
Figure 1D:
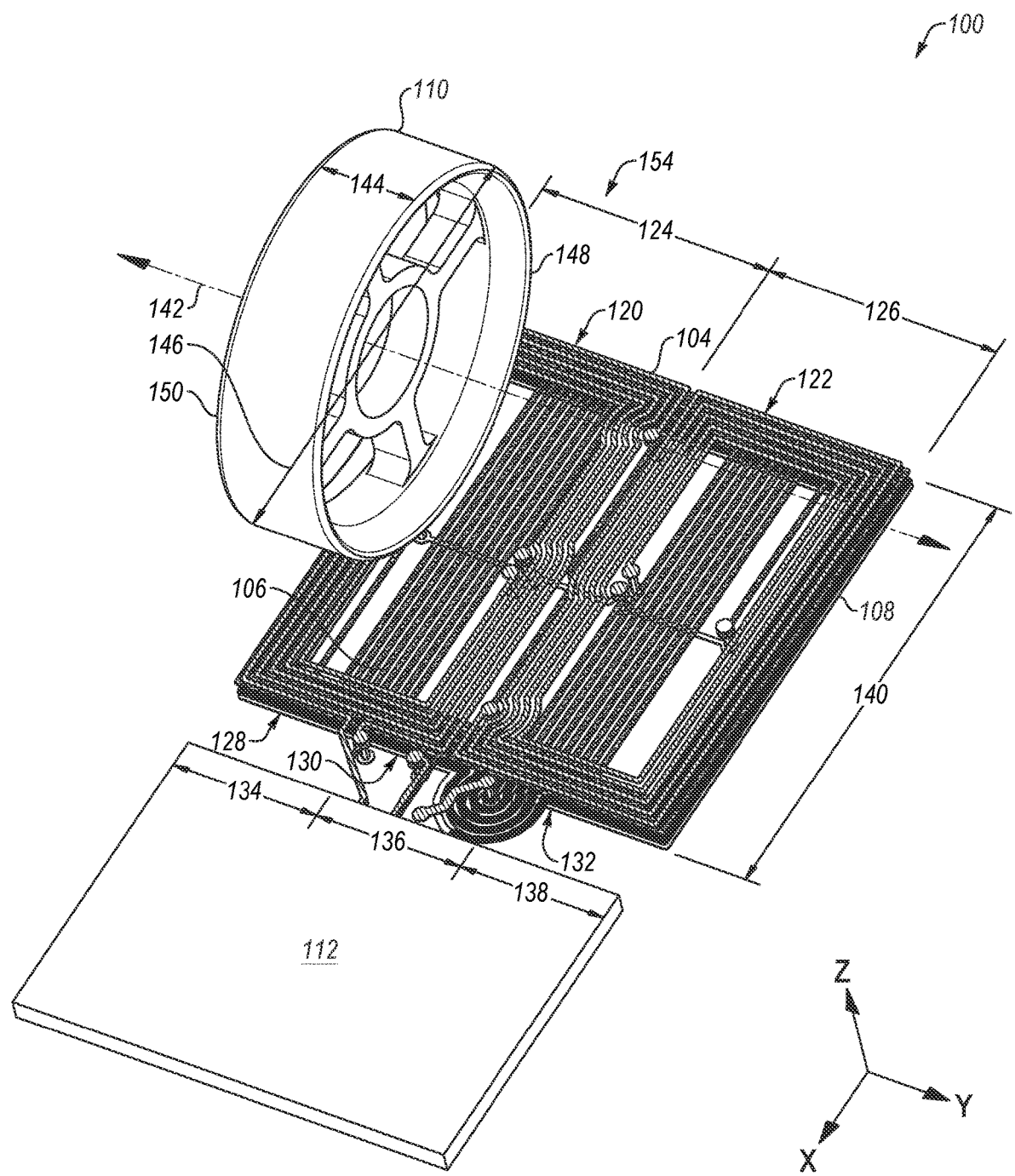
FIG. 1D is a schematic diagram illustrating a perspective view of the example inductive linear-position sensor of FIG. 1A, with the target in a second position, according to one or more examples.
Figure 2:
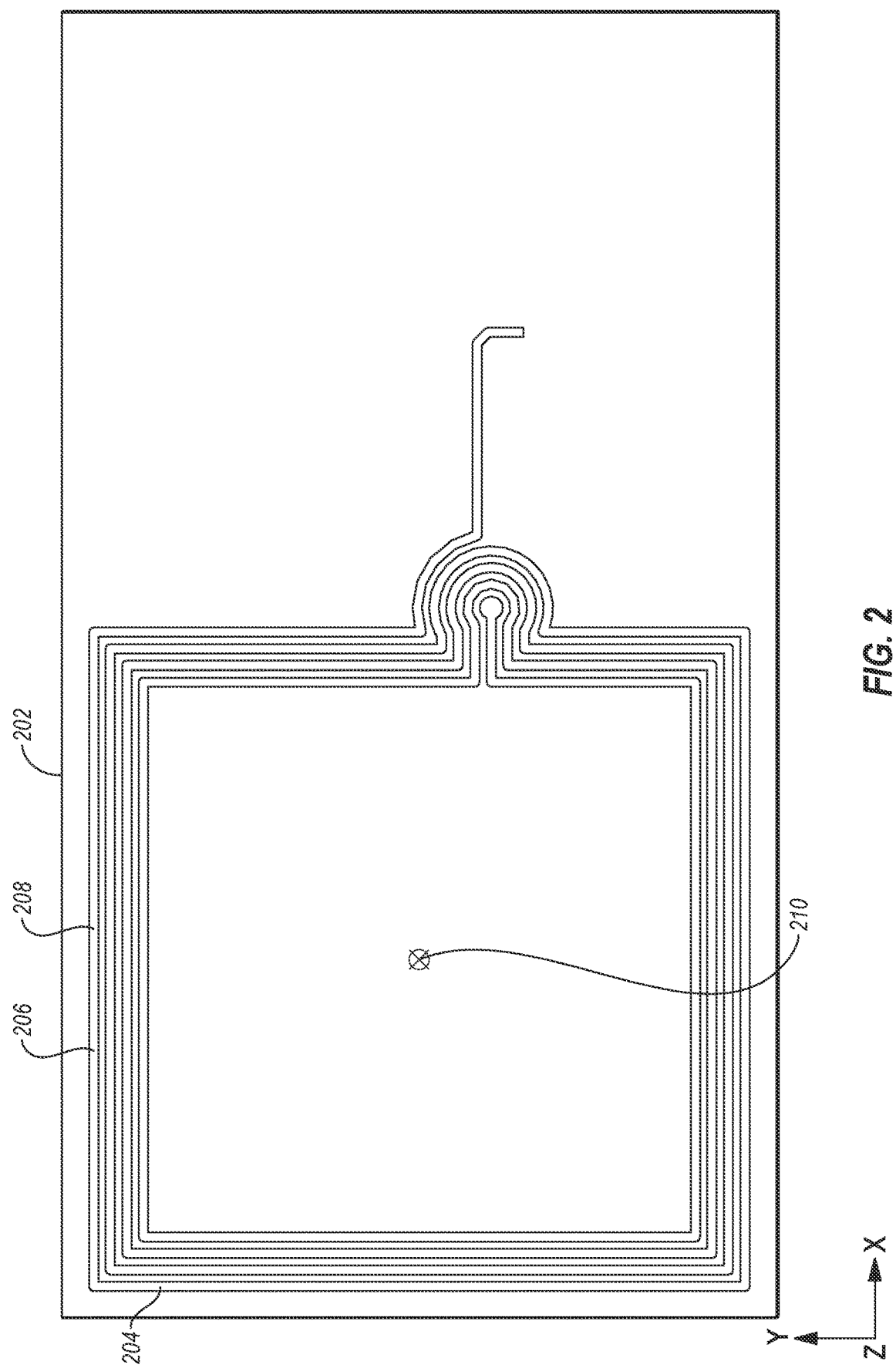
FIG. 2 is a schematic diagram illustrating a top view of a first example oscillator coil of an inductive linear-position sensor according to one or more examples.
Figure 3:
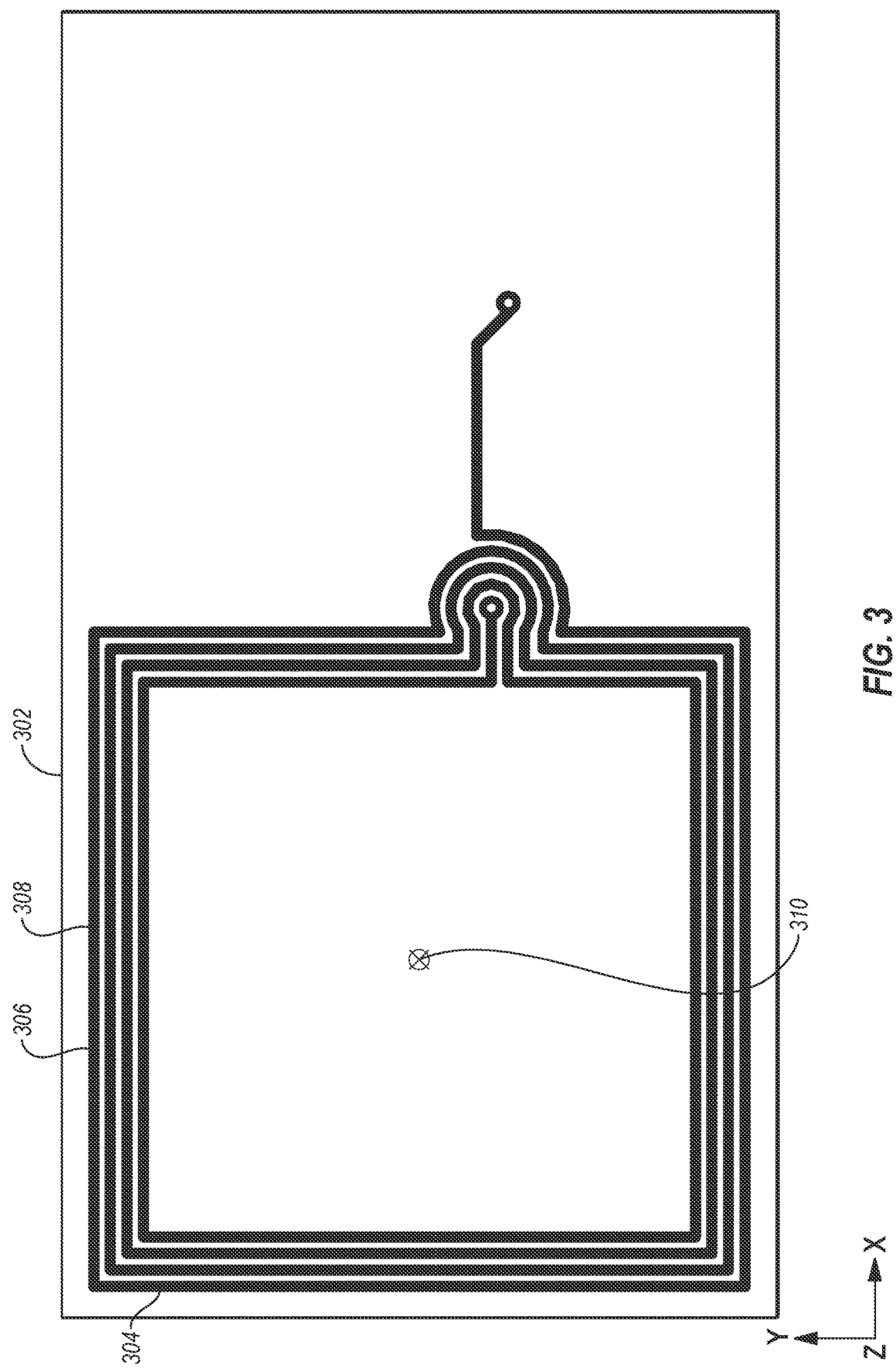
FIG. 3 is a schematic diagram illustrating a top view of a second example oscillator coil of an inductive linear-position sensor according to one or more examples.
Figure 4:
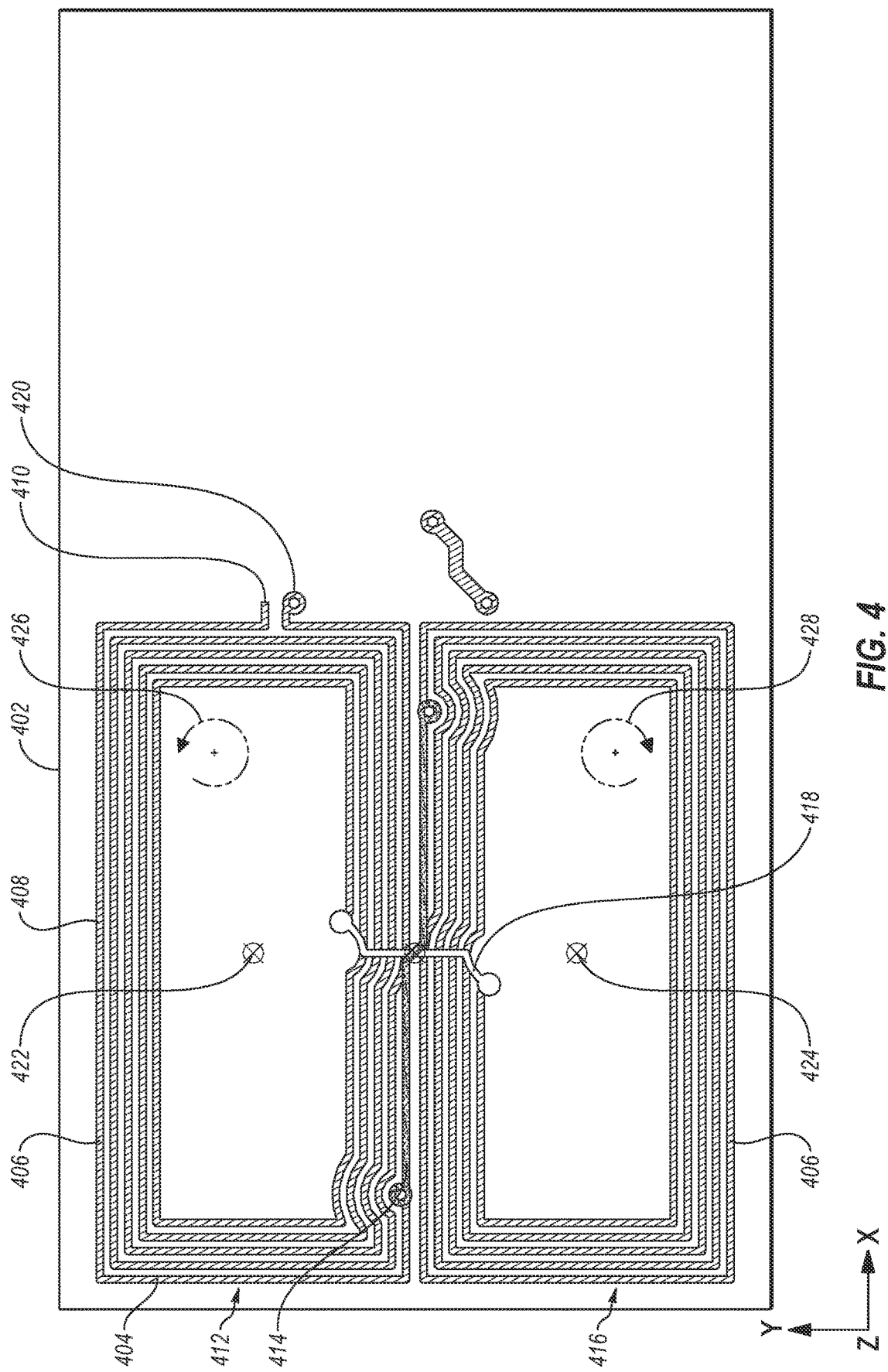
FIG. 4 is a schematic diagram illustrating a top view of a first example sense coil of an inductive linear-position sensor according to one or more examples.
Figure 5:
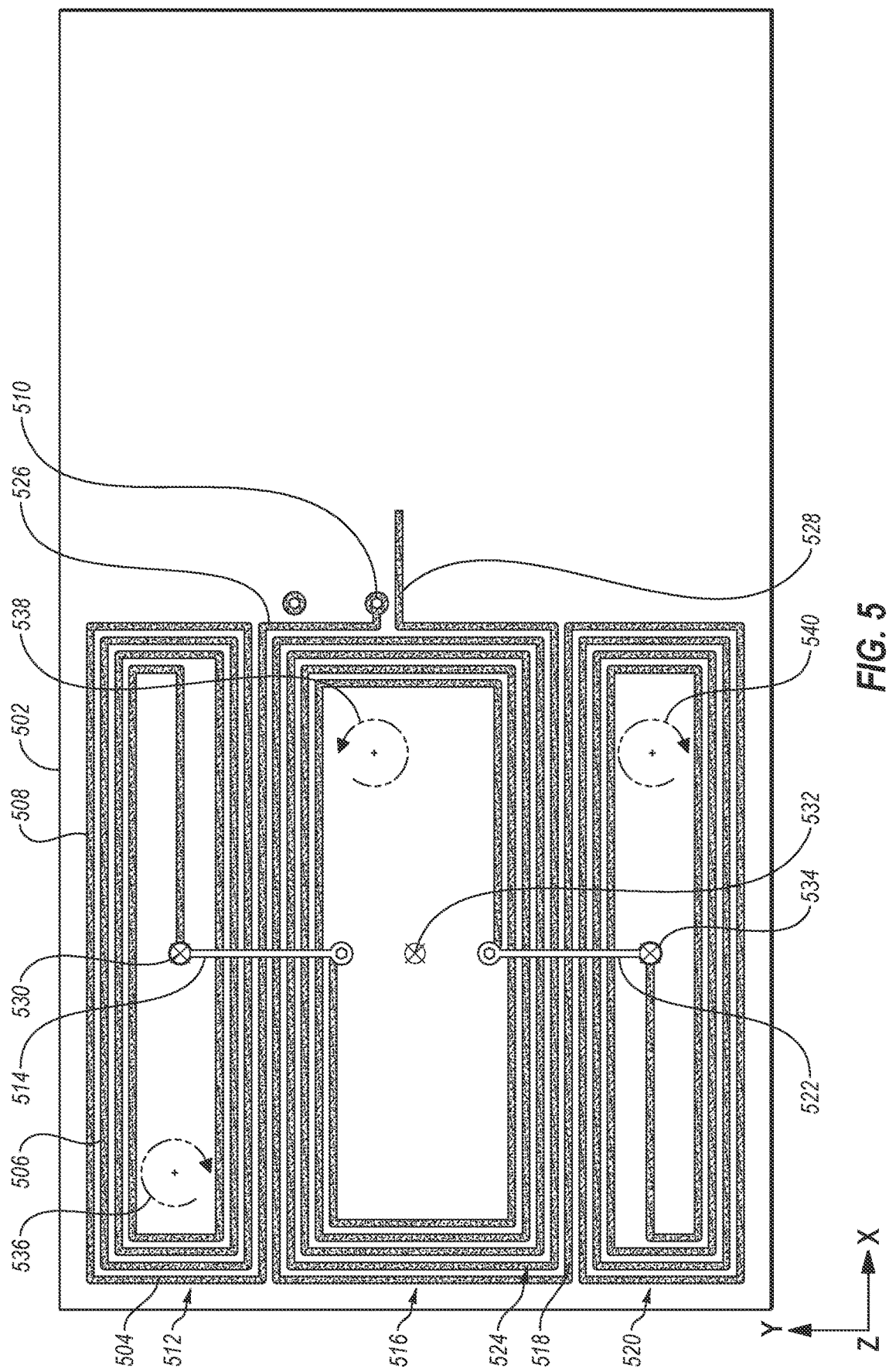
FIG. 5 is a schematic diagram illustrating a top view of a second example sense coil of an inductive linear-position sensor according to one or more examples.

In FIG. 1A-FIG. 5, electrically conductive material (e.g., forming sine sense coil 104, cosine sense coil 106, and oscillator coils 108) in a separate planes are illustrated using different fills. In particular, electrically conductive material in a first plane (e.g., a highest plane, without limitation) may be illustrated using an empty fill (e.g., completely white). Oscillator coil 108A may substantially be formed in the first plane. An example of oscillator coil 108A substantially in the first plane is illustrated in FIG. 2. Further, electrically conductive material in a second plane (e.g., a second-to-highest plane, without limitation) may be illustrated using a full fill (e.g., completely black). Oscillator coil 108B may substantially be formed in the second plane. An example of oscillator coil 108B substantially in the second plane is illustrated in FIG. 3. Further, electrically conductive material in a third plane (e.g., a third-from-highest plane, without limitation) may be illustrated using stippling (e.g., white with black dots). Cosine sense coil 106 may substantially be formed in the third plane. An example of cosine sense coil 106 substantially in the third plane is illustrated in FIG. 5. Further, electrically conductive material in a fourth plane (e.g., a fourth-from-highest plane, without limitation) may be illustrated using a diagonal-line fill pattern. Sine sense coil 104 may substantially be formed in the fourth plane. An example of the sine sense coil 104 substantially in the fourth plane is illustrated in FIG. 4. The order (from highest to lowest) of the planes described herein is given as an example and is not limiting.

Oscillator coils 108 may be configured to carry an excitation signal in a loop encircling a space. Oscillator coils 108 may include multiple passes (e.g., spiraling passes) through the loop encircling the space. Oscillator coil 108A may be configured to be 180° out of phase from oscillator coil 108B (when excited by an oscillating signal) which may magnify a magnetic field produced thereby. Further, the oscillator coils 108 may be center tapped windings. The excitation signal may be an oscillating signal with a frequency of between 1 megahertz (MHz) and 6 MHz, without limitation. An example of oscillator coil 108A substantially in a first plane is illustrated in FIG. 2; and an example of oscillator coil 108B substantially in a second plane is illustrated in FIG. 3.

Each of sine sense coil 104 and cosine sense coil 106 may be configured to be inductively coupled to oscillator coils 108. For example, each of sine sense coil 104 and cosine sense coil 106 may encircle a space that is encircled by oscillator coils 108. As another example, each of the sine sense coil 104 and the cosine sense coil 106 may encircle a space that is adjacent to a space encircled by the oscillator coils 108 (i.e., such that magnetic field around the oscillator coils, generated by the oscillator coils, passes through the sine sense coil 104 and the cosine sense coil 106). Thus, the excitation signal carried by oscillator coils 108 may induce a voltage signal (a "sense signal") at sine sense coil 104 and cosine sense coil 106 respectively (e.g., at the ends of sine sense coil 104 and cosine sense coil 106 as illustrated at the right of FIG. 1A proximate to IC area 112). Thus, the excitation signal carried by oscillator coils 108 around sine sense coil 104 may induce a "sine sense signal" at sine sense coil 104 and the excitation signal carried by oscillator coils 108 around cosine sense coil 106 may induce a "cosine sense signal" at cosine sense coil 106.

Sine sense coil 104 and cosine sense coil 106 may be substantially arranged in separate planes such that portions of sine sense coil 104 may be above portions of cosine sense coil 106 and portions of cosine sense coil 106 may be above portions of sine sense coil 104 without electrical coupling between sine sense coil 104 and cosine sense coil 106. Thus, a voltage of sine sense coil 104 may be independent of a voltage of cosine sense coil 106. Portions of sine sense coil 104 in separate planes may be electrically coupled by vias (not illustrated). Similarly, portions of cosine sense coil 106 in separate planes may be electrically coupled by vias (not illustrated).

Target 110 may be arranged relative to sine sense coil 104, cosine sense coil 106, and oscillator coils 108 to disturb the magnetic field generated at oscillator coils 108 that magnetically couples oscillator coils 108 to sine sense coil 104 and oscillator coils 108 to cosine sense coil 106. Target 110 may affect a degree of magnetic coupling between oscillator coils 108 and sine sense coil 104 and between oscillator coils 108 and cosine sense coil 106. As a non-limiting example target 110 may be formed of a non-ferromagnetic material. Target 110 may be arranged to disturb the magnetic field between oscillator coils 108 and all or a portion of a loop of sine sense coil 104 or between oscillator coils 108 and all or a portion of a loop of cosine sense coil 106.

The degree to which target 110 disturbs the magnetic field between oscillator coils 108 and sine sense coil 104 may affect the sine sense signal at sine sense coil 104. Likewise, the degree to which target 110 disturbs the magnetic field between oscillator coils 108 and cosine sense coil 106 may affect the cosine sense signal at cosine sense coil 106. In particular, target 110 above a portion of a loop of sine sense coil 104 may decrease the amplitude of the sine sense signal and target 110 above a portion of a loop of cosine sense coil 106 may decrease the amplitude of the cosine sense signal.

Stated another way, a respective portion of sine sense coil 104 and cosine sense coil 106 under target 110 may determine a degree to which target 110 disturbs the magnetic coupling between oscillator coils 108 and sine sense coil 104 and between oscillator coils 108 and cosine sense coil 106, respectively. Thus, a respective portion of sine sense coil 104 and cosine sense coil 106 under target 110 may determine an amplitude of each of the sine sense signal and the amplitude of the cosine sense signal. For example, if a first loop of sine sense coil 104 is entirely under target 110, the sine sense signal may be less than the cosine sense signal, which does not have a loop entirely under target 110.

Target 110 may be configured to move along a straight path (in the y-direction) above the loops of sine sense coil 104 and cosine sense coil 106. As target 110 moves, target 110 may be over different portions of sine sense coil 104 and cosine sense coil 106. Thus, as target 110 moves, it may modulate the amplitude of each of the sine sense signal and cosine sense signal. An example of a modulated sine sense signals is given in FIG. 6A and an example of a modulated cosine sense signal is given in FIG. 6B.

Figure 7:
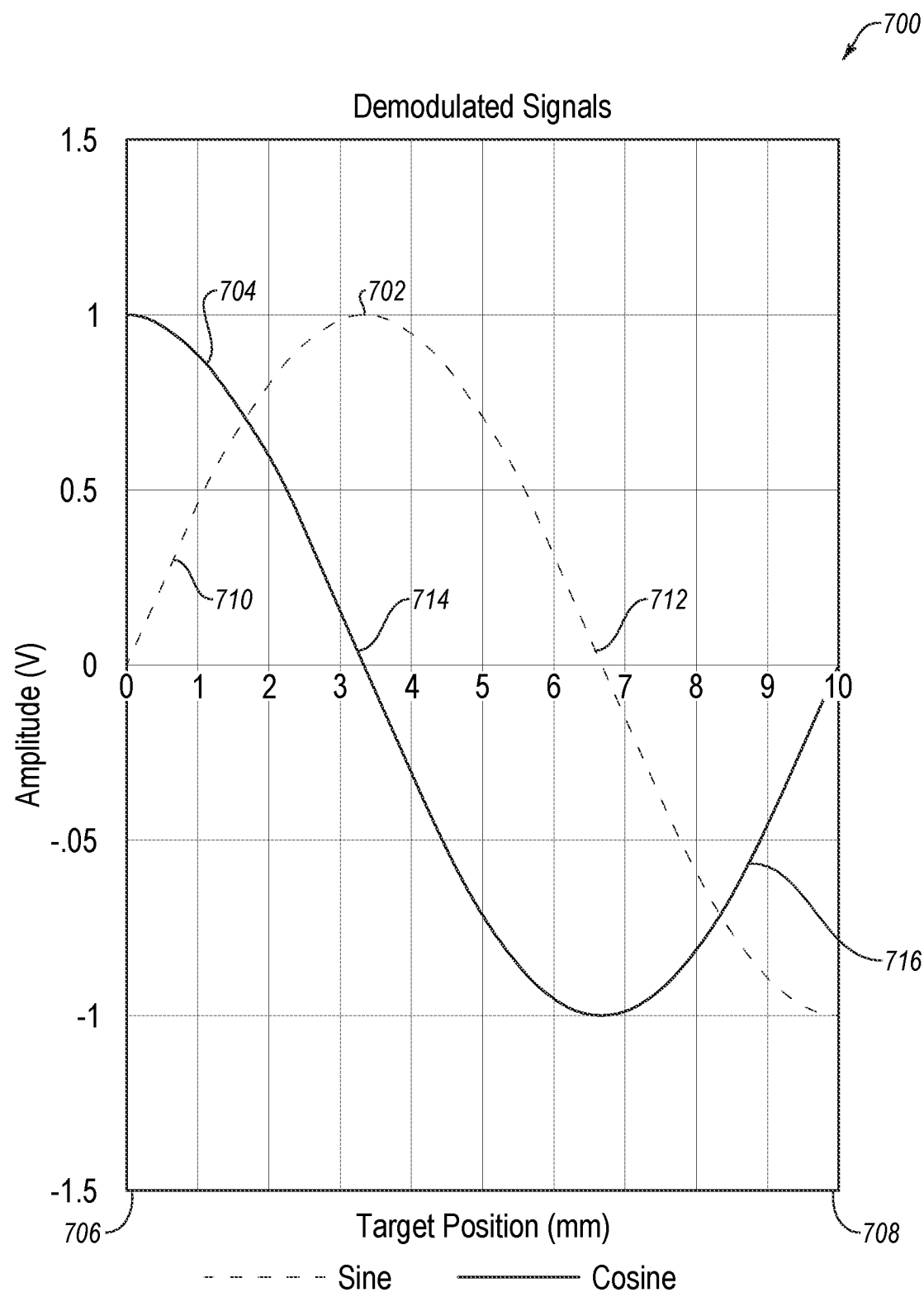
FIG. 7 is a graph illustrating a first demodulated signal and a second demodulated signal according to one or more examples.

Sine sense coil 104 is referred using the term "sine" and cosine sense coil 106 is referred to using the term "cosine" to differentiate between the two and because, based on the arrangement of the loops of sine sense coil 104 and cosine sense coil 106, the modulation of the sine sense signal and the modulation of the cosine sense signals are 90 degrees out of phase. The terms "sine" and "cosine" are thus used for descriptive purposes and are not limiting. As a non-limiting example, FIG. 7 illustrates an example sine demodulated signal and an example cosine demodulated signal exhibiting a 90 degree phase difference.

Inductive linear-position sensor 100 may include IC 114 mounted in IC area 112. IC 114 may be configured to receive the modulated sine sense signal and the modulated cosine sense signal and generate one or more output signals based on the modulated sine sense signal and the modulated cosine sense signal. Examples of output signals that may be generated by IC 114 are given in FIG. 7 and FIG. 8. Additionally or alternatively, IC 114 may include an oscillator to generate the excitation signal.

FIG. 1B is a schematic diagram illustrating a side view of the example inductive linear-position sensor 100 of FIG. 1A according to one or more examples. FIG. 1B illustrates target 110 above support structure 102 and coils 116. Coils 116 may include oscillator coils 108, sine sense coil 104, and cosine sense coil 106 formed in or on support structure 102. There is an airgap 118 between target 110 and support structure 102. Some examples may, by virtue of including multiple passes through loops of the sine sense coil and the cosine sense coil substantially in two planes, allow inductive linear-position sensor 100 to have greater sensitivity than other inductive linear-position sensors with other configurations of sine sense coils and cosine sense coils. The greater sensitivity may allow inductive linear-position sensor 100 to have a larger airgap 118 while being capable of producing similar results to the other inductive linear-position sensors.

Target 110 has a semi-circular profile 148 at a portion closest to support structure 102. Semi-circular profile 148 may cause a sinusoidal modulation of sine sense signals and cosine sense signals. As a non-limiting example, because of the distances between various portions of target 110 and coils 116, as target 110 moves over coils 116 the sine sense signals and the cosine sense signals may be amplitude modulated in a sinusoidal fashion. An example of a modulated sine sense signals is given in FIG. 6A and an example of a modulated cosine sense signal is given in FIG. 6B. An example of the sine demodulated signal and the cosine demodulated signal is given in FIG. 7. Other examples (not illustrated) include targets having an oval profile or at least a semi-oval profile.

Further, inductive linear-position sensor 100 has a circular profile 150. Thus, target 110 may rotate while it moves relative to support structure 102 while causing the same modulation to the sine sense signal and the cosine sense signal as if target 110 were moving without rotating.

FIG. 1C is a schematic diagram illustrating a perspective view of the example inductive linear-position sensor 100 of FIG. 1A, with the target in a first location 152, according to one or more examples.

FIG. 1D is a schematic diagram illustrating a perspective view of the example inductive linear-position sensor 100 of FIG. 1A, with the target in a second location 154, according to one or more examples. In FIG. 1D several specific features of inductive linear-position sensor 100 have been labeled.

Sine sense coil 104 includes lobe 120 and lobe 122. Lobe 120 has a length 124 and lobe 122 has a length 126. Sine sense coil 104 has a width 140. In the present disclosure, the term "length," when referring to coils, may be used to refer to a measurement in a direction parallel to a direction in which a target may move. For example, length 124 and length 126 may be measured in a direction in which target 110 may move. Additionally or alternatively, in the term "width," when referring to coils, may be used to refer to a measurement in a direction perpendicular to the direction in which the target may move. For example, width 140 may be measured in a direction perpendicular to the direction in which target 110 may move. In some examples, length 124 may be as long as length 126.

Cosine sense coil 106 includes lobe 128, lobe 130, and lobe 132. Lobe 128 has a length 134, lobe 130 has a length 136, and lobe 132 has a length 138. Cosine sense coil 106 has width 140. In some examples, length 136 of lobe 130 may be generally double length 134 of lobe 128 and/or length 138 of lobe 132. In some examples, length 134 may be as long as length 138. In some examples, length 136 may be as long as length 124 and/or length 126. In some examples, length 136 may be twice as long as length 134 or length 138.

Oscillator coils 108 have width 140 and have a length equal to the sum of length 124 and length 126 or a length equal to the sum of length 134, length 138, and length 136.

Target 110 is configured to move along a path 142. Target 110 has a thickness 144 and a width 146. In some examples, thickness 144 may be between half as long as length 134 and as long as length 134. Target 110 has a semi-circular profile 148 nearest support structure 102 and, in the example illustrated in FIG. 1D, target 110 has a circular profile 150. The width 146 is defined along a diameter of target 110 in relation to the semi-circular profile 148. In some examples, width 146 may be substantially the same as width 140. Target 110, because of circular profile 150, is such that if target 110 were rotated around an axis defined by path 142 while moving along path 142, the amplitude modulation of a sine sense signal in sine sense coil 104 and the amplitude modulation of a cosine sense signal in cosine sense coil 106 would be the same whether target 110 were rotated around the axis or not.

FIG. 2 is a schematic diagram illustrating a top view of a first example oscillator coil 204 of an inductive linear-position sensor according to one or more examples. Oscillator coil 204 may be an example of oscillator coil 108A of inductive linear-position sensor 100 of FIG. 1A-FIG. 1D.

Oscillator coil 204 may be formed of electrically conductive material 208 arranged at (e.g., on or in, without limitation) support structure 202 which may be an example of support structure 102 of FIG. 1A-FIG. 1D.

Oscillator coil 204 is substantially in a single plane, e.g., the highest plane, as indicated by the illustration of oscillator coil 204 using an empty fill. Oscillator coil 204 defines a continuous path 206 including multiple passes around an axis 210.

FIG. 3 is a schematic diagram illustrating a top view of a second example oscillator coil 304 of an inductive linear-position sensor according to one or more examples. Oscillator coil 304 may be an example of oscillator coil 108B of inductive linear-position sensor 100 of FIG. 1A-FIG. 1D.

Oscillator coil 304 may be formed of electrically conductive material 308 arranged at (e.g., on or in, without limitation) support structure 302 which may be an example of support structure 102 of FIG. 1A-FIG. 1D.

Oscillator coil 304 is substantially in a single plane, e.g., the second-to-highest plane, as indicated by the illustration of oscillator coil 304 using a full fill. Oscillator coil 304 defines a continuous path 306 including multiple passes around an axis 310. Axis 310 may or may not be the same as axis 210 of FIG. 2.

FIG. 4 is a schematic diagram illustrating a top view of a first example sine sense coil 404 of an inductive linear-position sensor according to one or more examples. Sine sense coil 404 may be an example of a sine sense coil 104 of inductive linear-position sensor 100 of FIG. 1A-FIG. 1D.

Sine sense coil 404 may be formed of electrically conductive material 408 arranged at (e.g., on or in, without limitation) support structure 402 which may be an example of support structure 102 of FIG. 1A-FIG. 1D.

Sine sense coil 404 defines a continuous path 406, e.g., beginning at a first location 410 and ending at a second location 420. Sine sense coil 404 may be configured such that an electrical current may traverse continuous path 406. For example, an excitation signal at an oscillator coil (e.g., oscillator coils 108 of FIG. 1A-FIG. 1D) may cause an oscillating current in sine sense coil 404. Between one time and a next time, i.e., during a first half of a cycle, the oscillating current may flow on continuous path 406 of sine sense coil 404 in a first direction. According to the oscillation of the excitation signal, and the oscillation of the current, the current may also traverse continuous path 406 in a reverse direction, i.e., during a second half of the cycle. However, for descriptive purposes, in the present disclosure, continuous path 406 will be described as having a direction, i.e., between first location 410 and second location 420.

Continuous path 406 may include first path portion 416 including multiple spiraling looping passes around axis 424. Continuous path 406 may also include second path portion 412, laterally spaced from first path portion 416, including multiple spiraling looping passes around axis 422. Each of first path portion 416 and second path portion 412 may be generally rectangular in shape. Continuous path 406 may further include first coupling path portion 414 coupling second path portion 412 to first path portion 416 and second coupling path portion 418 coupling first path portion 416 to second path portion 412. First path portion 416 may correspond to lobe 122 of FIG. 1D and second path portion 412 may correspond to lobe 120 of FIG. 1D.

Continuous path 406 may begin at first location 410. Continuous path 406 may pass along the outer right side, outer top side, and outer left side of second path portion 412. Continuous path 406 may then continue from an outer portion of second path portion 412 to first coupling path portion 414. At first coupling path portion 414, continuous path 406 may couple from the outer portion of second path portion 412 to an outer portion of first path portion 416. At first path portion 416, continuous path 406 may follow a spiraling (e.g., inwardly) path around axis 424. First path portion 416 may include any number of passes around axis 424. Continuous path 406 may traverse first path portion 416 in a clockwise direction 428. At an inner portion of first path portion 416, continuous path 406 may continue to second coupling path portion 418. At second coupling path portion 418, continuous path 406 may couple from the inner portion of first path portion 416 to an inner portion of second path portion 412. At second path portion 412, continuous path 406 may follow a spiraling (e.g., outwardly) path around axis 422. Second path portion 412 may include any number of passes around axis 422. Continuous path 406 may traverse second path portion 412 in a counter-clockwise direction 426. At an outer portion of second path portion 412, continuous path 406 may arrive at second location 420.

Sine sense coil 404 is substantially in a single plane, e.g., the fourth-to-highest plane, as indicated by sine sense coil 404 being illustrated using a diagonal-line fill pattern. In particular, first path portion 416 and second path portion 412 may be in a single respective plane (e.g., the fourth plane, without limitation). Second coupling path portion 418 and first coupling path portion 414 may be in other planes (e.g., first coupling path portion 414 may be in the third plane and second coupling path portion 418 may be in the first plane, without limitation). Sine sense coil 404 may include vias (not illustrated) electrically coupling first path portion 416 to second coupling path portion 418 and first coupling path portion 414 and second path portion 412 to second coupling path portion 418 and first coupling path portion 414.

FIG. 5 is a schematic diagram illustrating a top view of a first example cosine sense coil 504 of an inductive linear-position sensor according to one or more examples. Cosine sense coil 504 may be an example of a cosine sense coil 106 of inductive linear-position sensor 100 of FIG. 1A-FIG. 1D.

Cosine sense coil 504 may be formed of electrically conductive material 508 arranged at (e.g., on or in, without limitation) support structure 502 which may be an example of support structure 102 of FIG. 1A-FIG. 1D.

Cosine sense coil 504 defines a continuous path 506, e.g., beginning at a first location 510 and ending at a second location 528. Cosine sense coil 504 may be configured such that an electrical current may traverse continuous path 506. For example, an excitation signal at an oscillator coil (e.g., oscillator coils 108 of FIG. 1A-FIG. 1D) may cause an oscillating current in cosine sense coil 504. Between one time and a next time, i.e., during a first half of a cycle, the oscillating current may flow on continuous path 506 of cosine sense coil 504 in a first direction. According to the oscillation of the excitation signal, and the oscillation of the current, the current may also traverse continuous path 506 in a reverse direction, i.e., during a second half of the cycle. However, for descriptive purposes, in the present disclosure, continuous path 506 will be described as having a direction, i.e., between first location 510 and second location 528.

Continuous path 506 may include a first path portion 512 including multiple spiraling looping passes around axis 530. Continuous path 506 may also include second path portion 516, laterally spaced from first path portion 512, including multiple spiraling looping passes around axis 532. Continuous path 506 may also include third path portion 520, laterally spaced from first path portion 512 and second path portion 516, including multiple spiraling looping passes around axis 534. Continuous path 506 may also include fourth path portion 524, laterally spaced from first path portion 512 and third path portion 520, including multiple spiraling looping passes around axis 532. Fourth path portion 524 may be interleaved with second path portion 516. First path portion 512 may correspond to lobe 128 of FIG. 1D, second path portion 516 and fourth path portion 524 may correspond to lobe 130 of FIG. 1D, and third path portion 520 may correspond to lobe 132 of FIG. 1D.

Each of first path portion 512, second path portion 516, third path portion 520, and fourth path portion 524, may be generally rectangular in shape. Continuous path 506 may further include first coupling path portion 514 coupling first path portion 512 to second path portion 516, second coupling path portion 518 coupling second path portion 516 to third path portion 520, third coupling path portion 522 coupling third path portion 520 to fourth path portion 524 and fourth coupling path portion 526 coupling first location 510 to first path portion 512.

Continuous path 506 may begin at first location 510. Continuous path 506 may pass along the outer right side of second path portion 516. Continuous path 506 may then continue from an outer portion of second path portion 516 to fourth coupling path portion 526. At fourth coupling path portion 526, continuous path 506 may couple from the outer portion of second path portion 516 to an outer portion of first path portion 512. At first path portion 512, continuous path 506 may follow a spiraling (e.g., inwardly) path around axis 530. First path portion 512 may include any number of passes around axis 530. Continuous path 506 may traverse first path portion 512 in a clockwise direction 536. At an inner portion of first path portion 512, continuous path 506 may continue to first coupling path portion 514. At first coupling path portion 514, continuous path 506 may couple from the inner portion of first path portion 512 to an inner portion of second path portion 516. At second path portion 516, continuous path 506 may follow a spiraling (e.g., outwardly) path around axis 532. Second path portion 516 may include any number of passes around axis 532. Continuous path 506 may traverse second path portion 516 in a counter-clockwise direction 538. At an outer portion of second path portion 516, continuous path 506 may continue to second coupling path portion 518. At second coupling path portion 518, continuous path 506 may couple from the outer portion of second path portion 516 to an outer portion of third path portion 520. At third path portion 520, continuous path 506 may follow a spiraling (e.g., inwardly spiraling) path around axis 534. Third path portion 520 may include any number of passes around axis 534. Continuous path 506 may traverse path portion 520 in a clockwise direction 540. At an inner portion of third path portion 520, continuous path 506 may continue to third coupling path portion 522. At third coupling path portion 522, continuous path 506 may couple from the inner portion of third path portion 520 to an inner portion of fourth path portion 524. At fourth path portion 524, continuous path 506 may follow a spiraling (e.g., outwardly) path around axis 532. Fourth path portion 524 may include any number of passes around axis 532. Continuous path 506 may traverse fourth path portion 524 in counter-clockwise direction 538. At an outer portion of fourth path portion 524, continuous path 506 may arrive at second location 528.

First path portion 512 may be arranged at a first portion of the support structure (e.g., a top portion from the orientation illustrated in FIG. 5). Third path portion 520 may be arranged at a second portion of the support structure opposing the first portion of the support structure (e.g., a bottom portion from the orientation illustrated in FIG. 5). Second path portion 516 and fourth path portion 524 may be arranged between the first portion and the second portion.

Second path portion 516 may be interleaved with fourth path portion 524. For example, an outwardly spiraling loop of second path portion 516 may be between two outwardly spiraling loops of fourth path portion 524 and an outwardly spiraling loop of fourth path portion 524 may be between two outwardly spiraling loops of second path portion 516. Second path portion 516 and fourth path portion 524 may both include multiple passes around axis 532. Second path portion 516 and fourth path portion 524 may both follow an outwardly spiraling path around axis 532. Continuous path 506 may traverse both second path portion 516 and fourth path portion 524 in counter-clockwise direction 538.

Cosine sense coil 504 is substantially in a single plane, e.g., the third-to-highest plane, as indicated by cosine sense coil 504 being illustrated using a stippling. In particular, first path portion 512, path portion 516, path portion 520, and path portion 524 may be in a single plane (e.g., the third plane, without limitation). Coupling path portion 514 and coupling path portion 522 may be in another plane (e.g., the first plane, without limitation). Cosine sense coil 504 may include vias (not illustrated) electrically coupling coupling path portion 514 to first path portion 512 and path portion 516 and coupling path portion 522 to path portion 520 and path portion 524.

If one or more of oscillator coil 204 of FIG. 2, and oscillator coil 304 of FIG. 3 is proximate to one or both of sine sense coil 404 of FIG. 4 and cosine sense coil 504 of FIG. 5 (e.g., as illustrated and described with regard to FIG. 1A-FIG. 1D, without limitation) and the one or more of oscillator coil 204, and oscillator coil 304 are excited with an excitation signal, e.g., an oscillating signal, a sense signal may be induced at one or both of sine sense coil 404 and cosine sense coil 504. The sense signal(s) may be an oscillating signal. If a target (e.g., target 110 of FIG. 1A-FIG. 1D, without limitation) is moved proximate to one or more of oscillator coil 204 and oscillator coil 304 and one or more of sine sense coil 404 and cosine sense coil 504, the sense signal(s) may be amplitude modulated as the target disturbs the magnetic coupling between the one or more of oscillator coil 204 and oscillator coil 304 and the one or more of sine sense coil 404 and cosine sense coil 504.

Figure 6A:
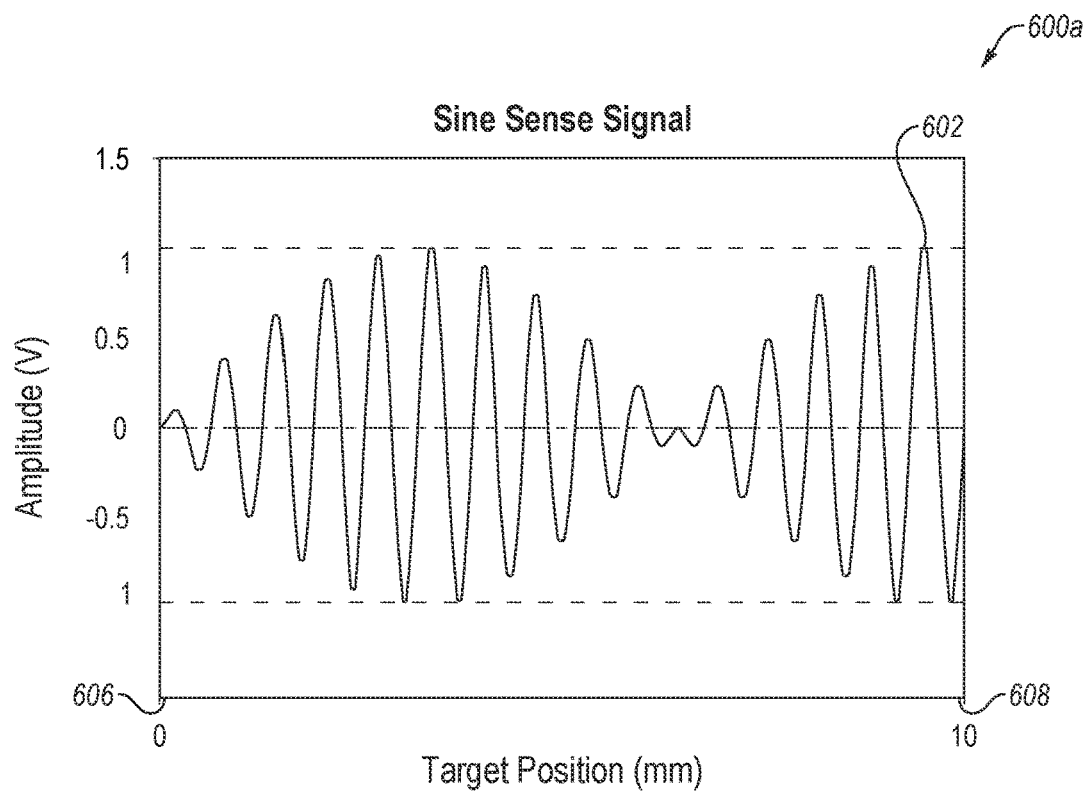
FIG. 6A is a graph illustrating a first modulated sense signal according to one or more examples.

FIG. 6A is a graph 600a illustrating a first modulated sense signal according to one or more examples. As a non-limiting example, the first sense signal is a sine sense signal 602, e.g., a sense signal that may be induced at a sine sense coil 104 or a sine sense coil 404, without limitation. Further, sine sense signal 602 is illustrated exhibiting amplitude modulation as a target moves from a first location 606 (e.g., location 152 of FIG. 1C) to a second location 608 (e.g., location 154 of FIG. 1D).

Figure 6B:
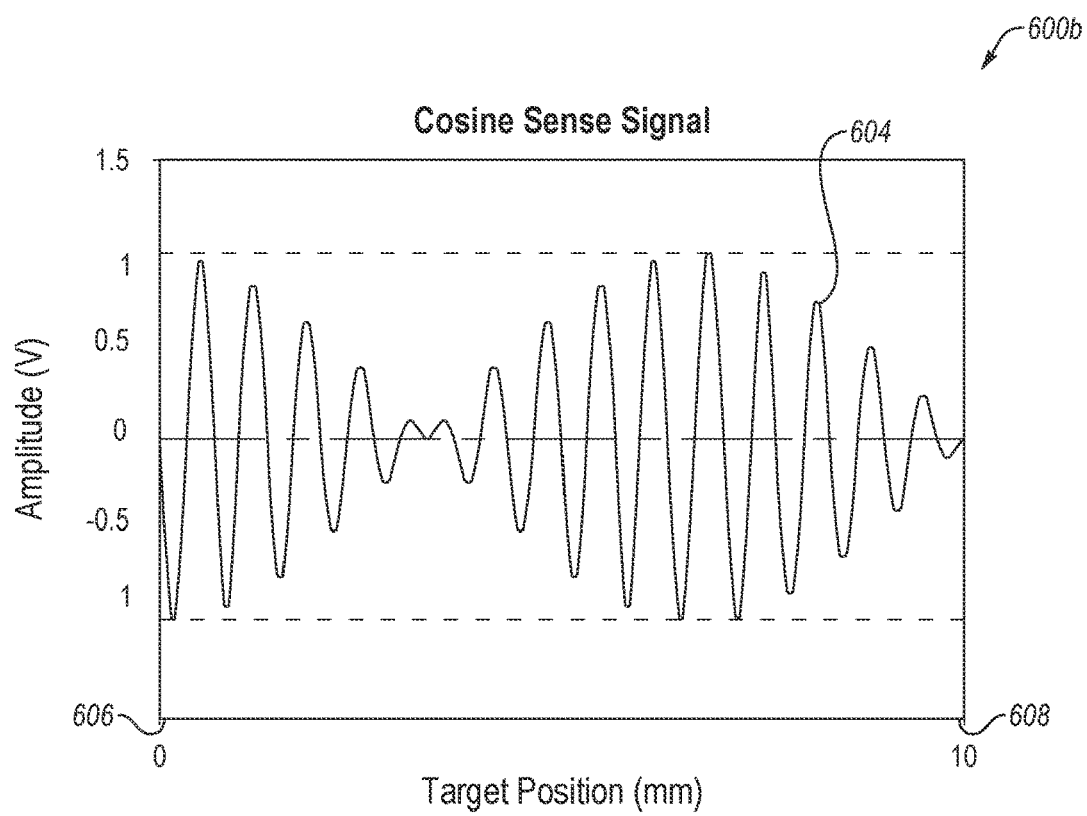
FIG. 6B is a graph illustrating a second modulated sense signal according to one or more examples.

FIG. 6B is a graph 600b illustrating a second modulated sense signal according to one or more examples. As a non-limiting example, the second sense signal is a cosine sense signal 604, e.g., a sense signal that may be induced at a cosine sense coil 106 or a cosine sense coil 504, without limitation. Further, cosine sense signal 604 is illustrated exhibiting amplitude modulation as a target moves from a first location 606 (e.g., location 152 of FIG. 1C) to a second location 608 (e.g., location 154 of FIG. 1D).

The frequency of the carrier signal (e.g., the oscillation frequency) in relation to the speed of the movement of the target illustrated in FIG. 6A and FIG. 6B is illustrated for descriptive and explanatory purposes and is not limiting.

FIG. 7 is a graph 700 illustrating a first demodulated signal and a second demodulated signal according to one or more examples. Sine demodulated signal 702 may be the amplitude modulation applied to sine sense signal 602 of FIG. 6A as a target moves from a first location 706 (e.g., location 152 of FIG. 1C) to a second location 708 (e.g., location 154 of FIG. 1D). In other words, sine demodulated signal 702 may be the envelope of sine sense signal 602 of FIG. 6A. Cosine demodulated signal 704 may be the amplitude modulation applied to cosine sense signal 604 of FIG. 6B as the target moves from first location 706 to second location 708. In other words, cosine demodulated signal 704 may be the envelope of cosine sense signal 604 of FIG. 6B.

As can be seen in FIG. 7, sine demodulated signal 702 and cosine demodulated signal 704 are 90 degrees out of phase.

Sine demodulated signal 702 exhibits an increasing portion 710 and a decreasing portion 712. As a non-limiting example, as a target moves from location 706 to location 708, sine demodulated signal 702 exhibits a sinusoidally-increasing portion 710 and a sinusoidally-decreasing portion 712. Further, as the target moves in reverse from location 708 to location 706, sine demodulated signal 702 may sinusoidally increase at decreasing portion 712 and may sinusoidally decrease at increasing portion 710.

Cosine demodulated signal 704 exhibits a decreasing portion 714 and an increasing portion 716. As a non-limiting example, as the target moves from location 706 to location 708, cosine demodulated signal 704 exhibits a sinusoidally-decreasing portion 714 and a sinusoidally-increasing portion 716. Further, as the target moves in reverse from location 708 to location 706, cosine demodulated signal 704 may sinusoidally decrease at increasing portion 716 and may sinusoidally increase at decreasing portion 714.

The sinusoidal shape of sine demodulated signal 702 and cosine demodulated signal 704 may be a result of the shape of the target relative to the coils (e.g., the oscillator coils and the sense coils). As a non-limiting example, a semi-circular profile of the target (at the portion closest to the coils) may cause the sinusoidal shape of sine demodulated signal 702 and cosine demodulated signal 704.

In various examples, an integrated circuit may be configured to output sine demodulated signal 702 and cosine demodulated signal 704, e.g., as a target moves relative to sense coils from which the integrated circuit is receiving sense signals. As a non-limiting example, referring to IC 114 of FIG. 1A, IC 114 may be configured to output sine demodulated signal 702 and cosine demodulated signal 704 as target 110 moves above sine sense coil 104 and cosine sense coil 106.

Figure 8:
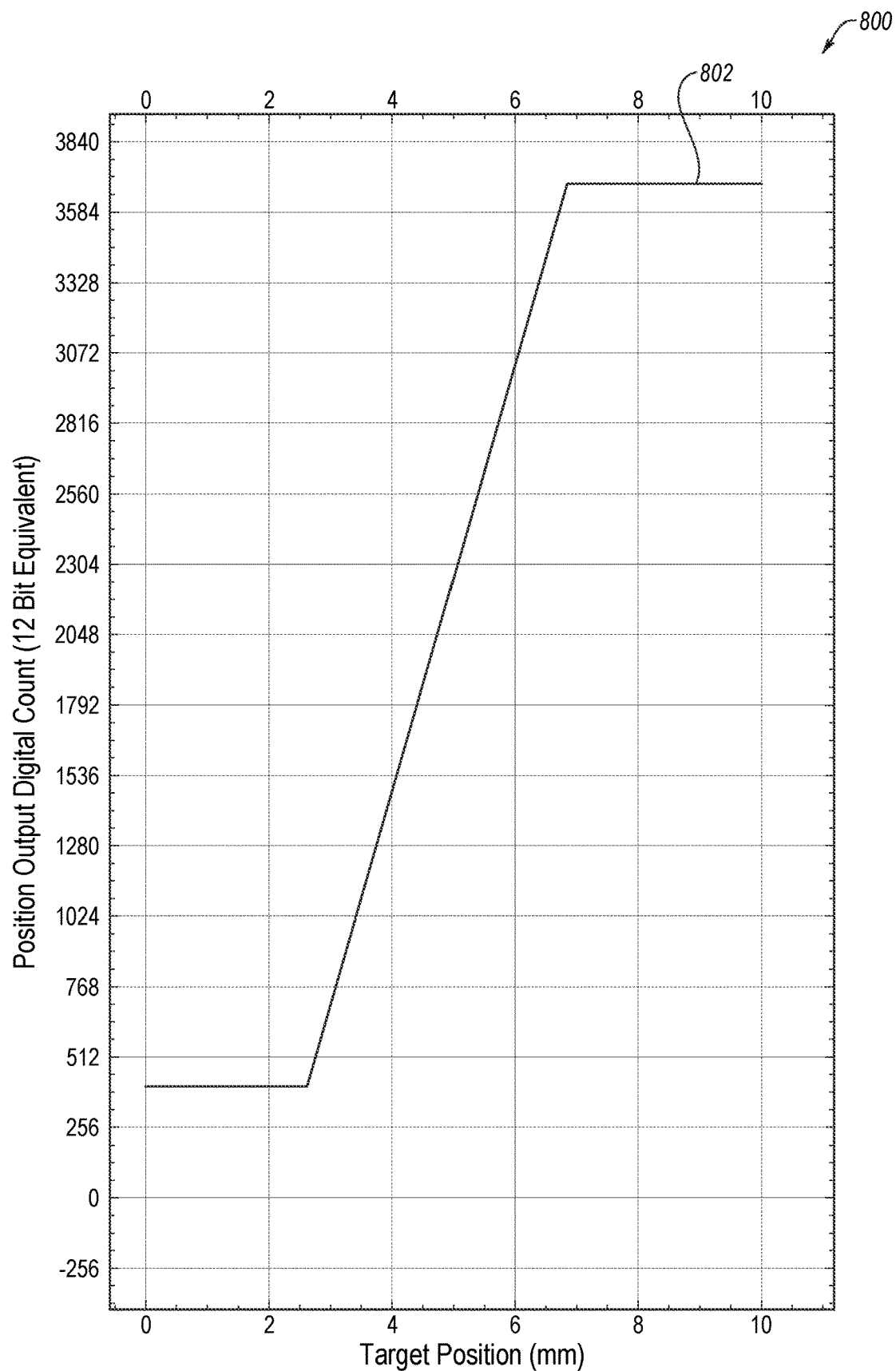
FIG. 8 is a graph illustrating an output signal according to one or more examples.

FIG. 8 is a graph 800 illustrating an output signal 802 according to one or more examples. In various examples, an integrated circuit may be configured to provide output signal 802 as a target moves relative to sense coils from which the integrated circuit is receiving sense signals. As a non-limiting example, referring to IC 114 of FIG. 1A, IC 114 may be configured to provide output signal 802 as target 110 moves above sine sense coil 104 and cosine sense coil 106. Output signal 802 may be obtained from sine sense signal 602 and cosine sense signal 604 or from sine demodulated signal 702 and cosine demodulated signal 704. As a non-limiting example, output signal 802 may be obtained by relating sine demodulated signal 702 to cosine demodulated signal 704, e.g., through a geometric relations, e.g., an arctangent. As a non-limiting example, output signal 802 may be obtained by performing a function such as arctan 2 (sine demodulated signal 702, cosine demodulated signal 704).

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, without limitation) of the computing system. In various examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

ADDITIONAL NON-LIMITING EXAMPLES OF THE DISCLOSURE MAY INCLUDE

Example 1

An apparatus comprising: a support structure; an electrically conductive material arranged at the support structure to define a continuous path for electrical current to flow between a first location and a second location, the continuous path comprising: a first path portion defining a first spiraling path for the electrical current to flow in a clockwise direction around a first axis; a second path portion laterally spaced from the first path portion and defining a second spiraling path for the electrical current to flow in a counter-clockwise direction around a second axis; a first coupling portion coupling an inner portion of the first path portion to an inner portion of the second path portion; and a second coupling portion coupling an outer portion of the second path portion to an outer portion of the first path portion.

Example 2

The apparatus according to Example 1, wherein the first path portion is generally rectangular in shape and the second path portion is generally rectangular in shape.

Example 3

The apparatus according to any of Examples 1 and 2, wherein the first path portion defines two or more inwardly spiraling loops and the second path portion defines two or more outwardly spiraling loops.

Example 4

An apparatus comprising: a support structure; an electrically conductive material arranged at the support structure to define a continuous path for electrical current to flow between a first location and a second location, the continuous path comprising: a first path portion defining a first spiraling path for the electrical current to flow in a clockwise direction around a first axis; a second path portion laterally spaced from the first path portion and defining a second spiraling path for the electrical current to flow in a counter-clockwise direction around a second axis; a first coupling portion coupling an inner portion of the first path portion to an inner portion of the second path portion; a third path portion laterally spaced from the first path portion and the second path portion and defining a third spiraling path for the electrical current to flow in a clockwise direction around a third axis; a second coupling portion coupling an outer portion of the second path portion to an outer portion of the third path portion; a fourth path portion interleaved with the second path portion and defining a fourth spiraling path for the electrical current to flow in the counter-clockwise direction around the second axis; and a third coupling portion coupling an inner portion of the third path portion to an inner portion of the fourth path portion.

Example 5

The apparatus according to Example 4, wherein each of the first path portion, the second path portion, the third path portion, and the fourth path portion is generally rectangular in shape.

Example 6

The apparatus according to any of Examples 4 and 5, wherein each of the first path portion and the third path portion defines two or more inwardly spiraling loops and each of the second path portion and the fourth path portion defines two or more outwardly spiraling loops.

Example 7

The apparatus according to any of Examples 4 through 6, wherein the first path portion is arranged at a first portion of the support structure, wherein the third path portion is arranged at a second portion of the support structure opposing the first portion of the support structure, and wherein the second path portion and the fourth path portion are arranged between the first portion and the second portion.

Example 8

The apparatus according to any of Examples 4 through 7, wherein the an outwardly spiraling loop of the second path portion is between two outwardly spiraling loops of the fourth path portion and an outwardly spiraling loop of the fourth path portion is between two outwardly spiraling loops of the second path portion.

Example 9

The apparatus according to any of Examples 4 through 8, wherein the each of the first path portion, the second path portion, the third path portion, and the fourth path portion have a width in a first lateral dimension and wherein each of the second path portion and the fourth path portion have a length in a second lateral dimension that is generally double a length in the second lateral dimension of each of the first path portion and the third path portion.

Example 10

The apparatus according to any of Examples 4 through 9, wherein the electrically conductive material comprises a first electrically conductive material and wherein the continuous path comprises a first continuous path, the apparatus comprising: a second electrically conductive material arranged at the support structure to define a second continuous path for electrical current to flow between a third location and a fourth location, the second continuous path comprising: a fifth path portion defining a fifth spiraling path for the electrical current to flow in a clockwise direction around a first axis; a sixth path portion laterally spaced from the first path portion and defining a sixth spiraling path for the electrical current to flow in a counter-clockwise direction around a second axis; a fifth coupling portion coupling an inner portion of the fifth path portion to an inner portion of the sixth path portion; and a sixth coupling portion coupling an outer portion of the sixth path portion to an outer portion of the fifth path portion.

Example 11

The apparatus according to any of Examples 4 through 10, wherein the electrically conductive material comprises a first electrically conductive material and wherein the continuous path comprises a first continuous path, the apparatus comprising a second electrically conductive material arranged at the support structure to define a second continuous path for electrical current to flow between a third location and a fourth location, wherein: the first continuous path is generally rectangular in shape; the second continuous path is generally rectangular in shape; the first continuous path and the second continuous path have a same width; and the first continuous path and the second continuous path have a same length.

Example 12

The apparatus according to any of Examples 4 through 11, comprising a target configured to move in a generally straight path over the first path portion, the second path portion, the third path portion, and the fourth path portion.

Example 13

The apparatus according to any of Examples 4 through 12, wherein a portion of the target closest to the support structure has a semicircular profile.

Example 14

An apparatus, comprising: a linear-position sensor comprising: a support structure; a first sense coil arranged at the support structure, the first sense coil defining two generally rectangular lobes; and a second sense coil arranged at the support structure, the second sense coil defining three generally rectangular lobes; and a target configured to move in a generally straight path over the two generally rectangular lobes of the first sense coil and the three generally rectangular lobes of the second sense coil, a portion of the target closest to the support structure having a semicircular profile.

Example 15

The linear-position sensor according to Example 14, wherein the target has a circular profile.

Example 16

The linear-position sensor according to any of Examples 14 and 15, wherein the target rotates around an axis defined by the generally straight path as the target moves along the generally straight path.

Example 17

The linear-position sensor according to any of Examples 14 through 16, wherein one of the two generally rectangular lobes of the second sense coil has a length in the direction of the generally straight path, and the target has a thickness in the direction of the generally straight path that is between half the length and the length.

Example 18

The linear-position sensor according to any of Examples 14 through 17, wherein each of the two generally rectangular lobes, the three generally rectangular lobes, and the target have a same width, in a dimension perpendicular to the direction of the generally straight path.

Example 19

The linear-position sensor according to any of Examples 14 through 18, wherein the two generally rectangular lobes have a combined length in the direction of the generally straight path and wherein the three generally rectangular lobes have the same combined length in the direction of the generally straight path.

Example 20

The linear-position sensor according to any of Examples 14 through 19, wherein each of the two generally rectangular lobes have a same length in the direction of the generally straight path, wherein one of the three generally rectangular lobes has the same length in the direction of the generally straight path and the other two of the three generally rectangular lobes have half of the same length in the direction of the generally straight path.

Example 21

The linear-position sensor according to any of Examples 14 through 20, comprising an oscillator coil arranged at the support structure, the oscillator coil having a generally rectangular shape.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus comprising:
   a support structure;
   an electrically conductive material arranged at the support structure to define a continuous path for electrical current to flow between a first location and a second location, the continuous path comprising:
   a first path portion on, or in, a plane of the support structure, the first path portion defining a first spiraling path of two or more spiraling loops for the electrical current to flow in a clockwise direction around a first axis, the first path portion comprising a first sense coil of an inductive position sensor;
   a second path portion on, or in, the plane of the support structure and laterally spaced from the first path portion, the second path portion defining a second spiraling path of two or more spiraling loops for the electrical current to flow in a counter-clockwise direction around a second axis, the second path portion comprising a second sense coil of the inductive position sensor;
   a first coupling portion on, or in, a first other plane parallel to the plane, the first coupling portion extending over, through vias, the two or more spiraling loops of the first path portion and the two or more spiraling loops of the second path portion for coupling an inner portion of the first path portion to an inner portion of the second path portion; and
   a second coupling portion on, or in, a second other plane parallel to the plane, the second coupling portion for coupling, through vias, an outer portion of the second path portion to an outer portion of the first path portion.

2. The apparatus of claim 1, wherein the first path portion is generally rectangular in shape and the second path portion is generally rectangular in shape.

3. The apparatus of claim 1, wherein the two or more spiraling loops of the first path portion comprise two or more inwardly spiraling loops and the two or more spiraling loops of the second path portion comprise two or more outwardly spiraling loops.

4. The apparatus of claim 1, wherein:
   the support structure comprises a printed circuit board (PCB), and
   the plane comprises a layer of the PCB.

5. The apparatus of claim 4, wherein:
   the vias of the first coupling portion are at respective inner portions of the first and the second path portions.

6. An apparatus comprising:
   a support structure;
   an electrically conductive material arranged at the support structure to define a continuous path for electrical current to flow between a first location and a second location, the continuous path comprising:
   a first path portion defining a first spiraling path of two or more spiraling loops for the electrical current to flow in a clockwise direction around a first axis;
   a second path portion laterally spaced from the first path portion and defining a second spiraling path of two or more spiraling loops for the electrical current to flow in a counter-clockwise direction around a second axis;
   a first coupling portion extending over the two or more spiraling loops of the first path portion and the two or more spiraling loops of the second path portion for coupling an inner portion of the first path portion to an inner portion of the second path portion;
   a third path portion laterally spaced from the first path portion and the second path portion and defining a third spiraling path of two or more spiraling loops for the electrical current to flow in a clockwise direction around a third axis;
   a second coupling portion coupling an outer portion of the second path portion to an outer portion of the third path portion;
   a fourth path portion interleaved with the second path portion and defining a fourth spiraling path of two or more spiraling loops for the electrical current to flow in the counter-clockwise direction around the second axis; and
   a third coupling portion extending over the two or more spiraling loops of the third path portion and the two or more spiraling loops of the fourth path portion for coupling an inner portion of the third path portion to an inner portion of the fourth path portion.

7. The apparatus of claim 6, wherein each of the first path portion, the second path portion, the third path portion, and the fourth path portion is generally rectangular in shape.

8. The apparatus of claim 6, wherein the two or more spiraling loops of the first path portion and the third path portion respectively comprise two or more inwardly spiraling loops and the two or more spiraling loops of the second path portion and the fourth path portion respectively comprise two or more outwardly spiraling loops.

9. The apparatus of claim 6, wherein the first path portion is arranged at a first portion of the support structure, wherein the third path portion is arranged at a second portion of the support structure opposing the first portion of the support structure, and wherein the second path portion and the fourth path portion are arranged between the first portion and the second portion.

10. The apparatus of claim 6, wherein an outwardly spiraling loop of the second path portion is between two outwardly spiraling loops of the fourth path portion and an outwardly spiraling loop of the fourth path portion is between two outwardly spiraling loops of the second path portion.

11. The apparatus of claim 6, wherein the first path portion, the second path portion, the third path portion, and the fourth path portion respectively have a width in a first lateral dimension and wherein the second path portion and the fourth path portion have a respective length in a second lateral dimension that is generally double a length in the second lateral dimension of the first path portion and the third path portion, respectively.

12. The apparatus of claim 6, wherein the electrically conductive material comprises a first electrically conductive material and wherein the continuous path comprises a first continuous path, the apparatus comprising:
   a second electrically conductive material arranged at the support structure to define a second continuous path for electrical current to flow between a third location and a fourth location, the second continuous path comprising:

a fifth path portion defining a fifth spiraling path for the electrical current to flow in a clockwise direction around a first axis;

a sixth path portion laterally spaced from the first path portion and defining a sixth spiraling path for the electrical current to flow in a counter-clockwise direction around a second axis;

a fifth coupling portion coupling an inner portion of the fifth path portion to an inner portion of the sixth path portion; and a sixth coupling portion coupling an outer portion of the sixth path portion to an outer portion of the fifth path portion.

13. The apparatus of claim 6, wherein the electrically conductive material comprises a first electrically conductive material and wherein the continuous path comprises a first continuous path, the apparatus comprising a second electrically conductive material arranged at the support structure to define a second continuous path for electrical current to flow between a third location and a fourth location, wherein:

the first continuous path is generally rectangular in shape;

the second continuous path is generally rectangular in shape;

the first continuous path and the second continuous path have a same width; and the first continuous path and the second continuous path have a same length.

14. The apparatus of claim 6, comprising a target configured to move in a generally straight path over the first path portion, the second path portion, the third path portion, and the fourth path portion.

15. The apparatus of claim 14, wherein a portion of the target closest to the support structure has a semicircular profile.

16. The apparatus of claim 6, wherein:

the first path portion and the second path portion are in a plane, and the first coupling portion is in another plane and electrically coupled to the inner portion of the first path portion and the inner portion of the second path portion through vias for extending over the two or more spiraling loops of the first path portion and the two or more spiraling loops of the second path portion.

17. The apparatus of claim 16, wherein:

the other plane is a first other plane, and the second coupling portion is in a second other plane and electrically coupled to the outer portion of the second path portion and the outer portion of the first path portion through vias.

18. An apparatus, comprising:

a linear-position sensor comprising:

a support structure;

a first sense coil arranged at the support structure, the first sense coil defining two generally rectangular lobes; and a second sense coil arranged at the support structure, the second sense coil defining three generally rectangular lobes; and a target configured to move in a generally straight path over the two generally rectangular lobes of the first sense coil and the three generally rectangular lobes of the second sense coil, a portion of the target closest to the support structure having a semicircular profile.

19. The linear-position sensor of claim 18, wherein the target has a circular profile.

20. The linear-position sensor of claim 19, wherein the target rotates around an axis defined by the generally straight path as the target moves along the generally straight path.

21. The linear-position sensor of claim 18, wherein one of the two generally rectangular lobes of the second sense coil has a length in a direction of the generally straight path, and the target has a thickness in the direction of the generally straight path that is between half the length and the length.

22. The linear-position sensor of claim 18, wherein each of the two generally rectangular lobes, the three generally rectangular lobes, and the target have a same width, in a dimension perpendicular to a direction of the generally straight path.

23. The linear-position sensor of claim 18, wherein the two generally rectangular lobes have a combined length in a direction of the generally straight path and wherein the three generally rectangular lobes have the same combined length in the direction of the generally straight path.

24. The linear-position sensor of claim 18, wherein each of the two generally rectangular lobes have a same length in a direction of the generally straight path, wherein one of the three generally rectangular lobes has the same length in the direction of the generally straight path and the other two of the three generally rectangular lobes have half of the same length in the direction of the generally straight path.

25. The linear-position sensor of claim 18, comprising an oscillator coil arranged at the support structure, the oscillator coil having a generally rectangular shape.

* * * * *

UNITED STATES PATENT AND TRADEMARK OFFICE
CERTIFICATE OF CORRECTION

PATENT NO. : 12,111,188 B2
APPLICATION NO. : 17/648743
DATED : October 8, 2024
INVENTOR(S) : Ganesh Shaga, Surendra Akkina and Sudheer Puttapudi It is certified that error appears in the above-identified patent and that said Letters Patent is hereby corrected as shown below:

In the Specification

Column 14, Lines 41-42, change "such as arctan 2 (sine demodulated" to --such as arctan2(sine demodulated--

Signed and Sealed this
Third Day of December, 2024

Katherine Kelly Vidal
*Director of the United States Patent and Trademark Office*